(12) United States Patent
Tanei

(10) Patent No.: US 7,137,367 B2
(45) Date of Patent: Nov. 21, 2006

(54) CONTROL APPARATUS AND CONTROL METHOD FOR INTERNAL COMBUSTION ENGINE VALVE ACTUATION

(75) Inventor: Katsutoshi Tanei, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 158 days.

(21) Appl. No.: 10/968,129

(22) Filed: Oct. 20, 2004

(65) Prior Publication Data

US 2005/0087158 A1    Apr. 28, 2005

(30) Foreign Application Priority Data

Oct. 22, 2003    (JP)    ............... 2003-361842

(51) Int. Cl.
*F01L 1/34*    (2006.01)
(52) U.S. Cl. ............... 123/90.15; 123/90.17; 123/90.31
(58) Field of Classification Search ............ 123/90.15, 123/90.16, 90.17, 90.18, 90.27, 90.31, 345, 123/346, 347, 348
See application file for complete search history.

(56) References Cited

U.S. PATENT DOCUMENTS 6,679,206 B1    1/2004    Takagi ............... 123/90.15
6,820,591 B1 *   11/2004   Tanei et al. ............ 123/406.21

FOREIGN PATENT DOCUMENTS

| JP | 11-218035 | 8/1999 |
| JP | 2004-239151 | 8/2004 |
| JP | 2004-360550 | 12/2004 |

* cited by examiner

*Primary Examiner*—Thomas Denion
*Assistant Examiner*—Ching Chang
(74) *Attorney, Agent, or Firm*—Kenyon & Kenyon LLP

(57) ABSTRACT

An apparatus controls actual actuation of each of a first and a second valve to the corresponding target actuation. A first computing portion computes the target actuation of the first valve and a target valve overlapping amount according to a engine operational state. A second computing portion computes a requested actuation of the second valve based on the target valve overlapping amount and the target actuation of the first valve. When the requested actuation is out of the permitted range of the second valve actuation, the second computing portion corrects the target actuation of the first valve based on the margin between the requested actuation and a limit of the permitted range. Hence, the engine operational state is maintained in a preferable state.

11 Claims, 10 Drawing Sheets

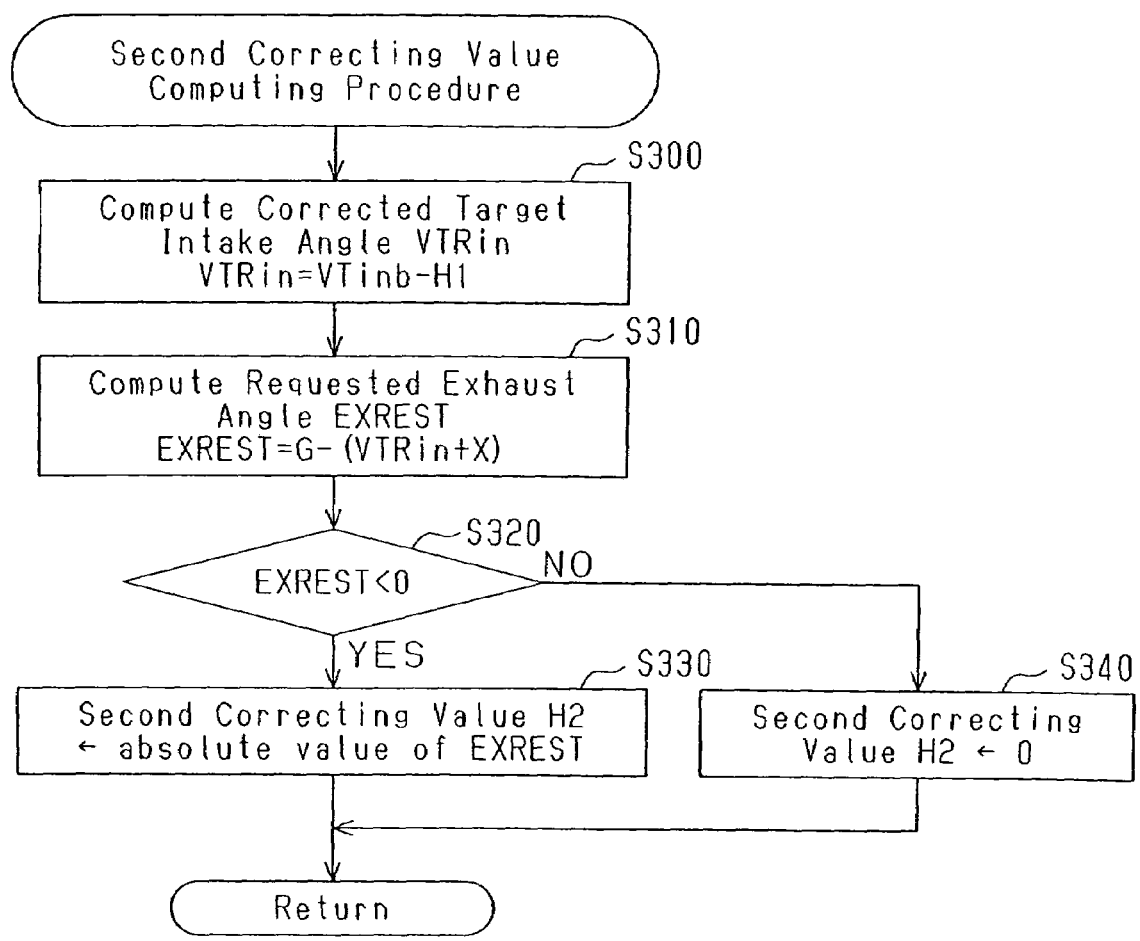

CONTROL APPARATUS AND CONTROL METHOD FOR INTERNAL COMBUSTION ENGINE VALVE ACTUATION

BACKGROUND OF THE INVENTION

The present invention relates to control apparatus and control methods for valve actuation of an internal combustion engine.

A variable valve mechanism is known for improving engine power or reducing exhaust emission. The mechanism varies the valve actuation of intake and exhaust valves such as valve timing (timings for opening or closing the valves) and valve lift amount. Particularly for automobile engines, a variable valve timing mechanism (VVT mechanism) is generally employed for the aforementioned purpose. The VVT mechanism varies the valve timings of the intake and exhaust valves by, for example, changing the relative rotational phase of a camshaft with respect to a crankshaft.

An engine having a so-called dual VVT system, as described in Japanese Laid-Open Patent Publication No. 11-218035, is also in use. In accordance with the dual VVT system, a VVT mechanism for an intake camshaft is installed separately from a VVT mechanism for an exhaust camshaft. In this manner, the valve timing of the intake valve and that of the exhaust valve may be varied independently.

The valve actuation control apparatus of the aforementioned publication, which includes the dual VVT system, separately computes the optimal valve timing for the intake valve and that for the exhaust valve according to the engine operational state. Each of the obtained valve timings is set to a target valve timing for the corresponding VVT mechanism. Each of the VVT mechanisms is then controlled to operate such that the actual valve timing becomes the target valve timing.

Through such controlling, the apparatus is capable of operating both of the intake and exhaust valves at the corresponding optimal valve timings, each of which corresponds with the engine operational state. However, the following problem may be presented when the valve timings are adjusted by the corresponding VVT mechanisms.

Generally, controlling of the valve actuation includes adjustment of the valve overlapping amount between the intake valve and the exhaust valve. That is, by optimizing the valve overlapping amount in accordance with the engine operational state, the internal EGR amount is adjusted such that the exhaust emission is reduced.

The above-described apparatus selects the target valve timings for each of the VVT mechanisms such that the valve overlapping amount becomes optimal in accordance with the engine operational state. However, the optimization of the valve overlapping amount is brought about only after both of the VVT mechanisms complete the adjustment of the valve timings to the corresponding target values. The response of the apparatus is thus relatively delayed, regarding the adjustment of the valve overlapping amount. Particularly, depending on the engine operational state, the adjustment of the valve overlapping amount greatly affects the exhaust emission. If this is the case, the exhaust emission may be increased due to the delayed response, which is until both of the VVT mechanisms complete the adjustment of the actual valve timings to the target values.

Further, even though the VVT mechanisms for the intake and exhaust valves are configured identical, the passages supplying fluid for driving the VVT mechanisms may not have equal dimensions. This causes a time lag between the response of the VVT mechanism for the intake valve and that for the exhaust valve. The following problem may thus occur, with reference to FIG. 11.

FIG. 11 shows an example of controlling of the valve timings for the intake and exhaust valves by means of the apparatus of the aforementioned publication. As indicated by the timing chart of FIG. 11, the response of the VVT mechanism for the intake valve is delayed with respect to the response of the VVT mechanism for the exhaust valve. More specifically, in the example of FIG. 11, each of the VVT mechanisms retards the valve timing of the corresponding valve from the state corresponding to timing T, for reducing the valve overlapping amount.

After the target valve timings are determined for changing the actual valve timings, each of the VVT mechanisms starts to retard the valve timing of the corresponding valve at timing T. Since the response of the VVT mechanism for the intake valve is retarded with respect to that for the exhaust valve, as aforementioned, the valve timing of the exhaust valve is changed relatively quickly as compared to that of the intake valve. This increases the valve overlapping amount, as compared to the initial state (timing T).

When the valve timing of the exhaust valve reaches the target valve timing at timing T1, the valve overlapping amount starts to decrease as the valve timing of the intake valve is gradually retarded. When the valve timing of the intake valve reaches the target valve timing at timing T2, the valve overlapping amount reaches the value corresponding to the engine operational state.

That is, the required valve overlapping amount is brought about when both of the VVT mechanisms complete the adjustment of the valve timings to the respective target values. However, although the valve overlapping amount must be decreased from the initial state, the valve overlapping amount is increased temporarily in an undesirable manner, before the adjustment is completed for both of the intake and exhaust valve. This increases the internal EGR amount excessively, thus raising the HC exhaust amount of the engine. The combustion temperature may also be lowered excessively. Further, the flow of the intake air from the intake passage to the exhaust passage may be increased excessively, destabilizing the combustion state. This may lead to an engine stall, which is least desirable.

In the same manner, when the valve timings of the intake and exhaust valves are adjusted such that the valve overlapping amount is increased, the valve overlapping amount may be decreased temporarily before the adjustment is completed. In this state, the internal EGR amount of each cylinder is decreased in an undesirable manner, thus raising the combustion temperature excessively, or increasing the NOx exhaust amount.

As has been described, the operation of the conventional apparatus, which sets the target valve timings of the intake and exhaust valves according to the engine operational state, is not necessarily appropriate in terms of the adjustment of the valve overlapping amount. Even if the apparatus may employ a different type of variable valve mechanisms than the VVT mechanisms, a similar problem may occur as long as the variable valve mechanisms are provided separately for the intake valve and the exhaust valve for varying the valve actuation of the intake valve and that of the exhaust valve respectively.

SUMMARY OF THE INVENTION

Accordingly, it is an objective of the present invention to provide a apparatus and a method for controlling valve actuation that maintain the engine operational state in a preferable state when adjustment is carried out, used in an internal combustion engine adjusting the valve actuation of intake and exhaust valves.

To achieve the foregoing and other objectives and in accordance with the purpose of the present invention, the invention provides a control apparatus for valve actuation of intake and exhaust valves of an internal combustion engine. The apparatus controls actual actuation of each of the intake valve and the exhaust valve to the corresponding target actuation. One of the intake valve and the exhaust valve is a first valve and the other is a second valve. The actuation of the second valve is set within a predetermined permitted range. The apparatus includes a first computing portion that computes the target actuation of the first valve and a target valve overlapping amount according to the engine operational state. The target valve overlapping amount is a target amount of a valve overlapping amount of a valve opening period of the first valve and a valve opening period of the second valve. The first computing portion computes the target actuation of the second valve based on the target valve overlapping amount and the actual actuation of the first valve. A second computing portion computes a requested actuation of the second valve based on the target valve overlapping amount and the target actuation of the first valve. When the requested actuation is out of the permitted range of the second valve actuation, the second computing portion corrects the target actuation of the first valve based on the margin between the requested actuation and a limit of the permitted range.

Another aspect of the present invention provides a method for controlling valve actuation of intake and exhaust valves of an internal combustion engine. The method includes obtaining a target actuation of the first valve and a target valve overlapping amount according to the engine operational state. A target actuation of the second valve is obtained based on the target valve overlapping amount and the actual actuation of the first valve. A requested actuation of the second valve is obtained based on the target valve overlapping amount and the target actuation of the first valve. The target actuation of the first valve is corrected based on the margin between the requested actuation and a limit of the permitted range when the requested actuation is out of the permitted range of the second valve actuation. The actual actuation of each of the intake valve and the exhaust valve are made to the corresponding target actuation.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a flowchart indicating a procedure for computing a second correcting value H2, executed by the apparatus of FIG. 1;

DETAILED DESCRIPTION OF THE PREFERRED EMBODIMENTS

An embodiment of the present invention will now be described with reference to FIGS. 1 to 7.

Figure 1:
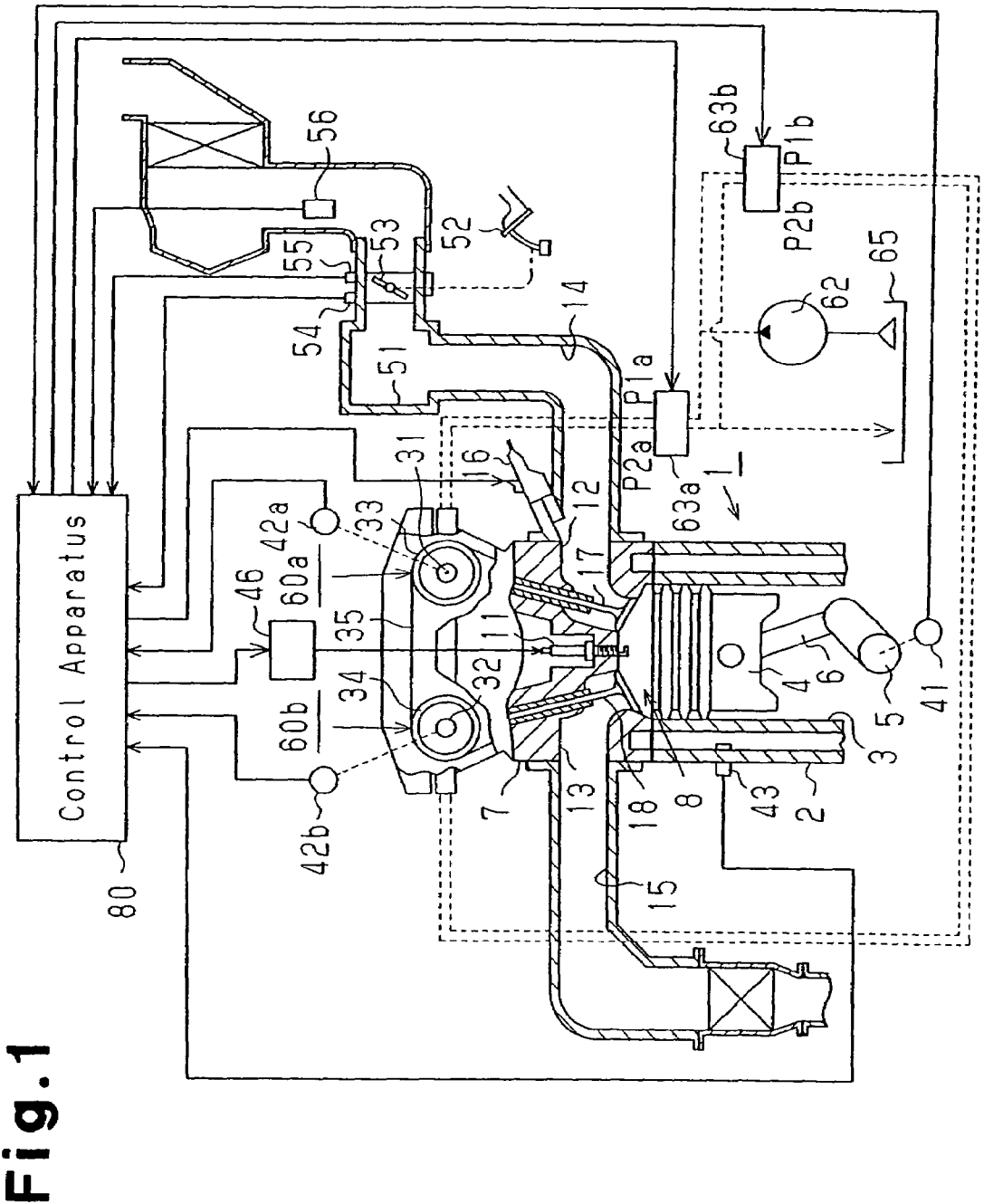
FIG. 1 is a schematic view showing the structure of a gasoline engine 1 to which a valve actuation control apparatus according to an embodiment of the present invention is applied.

FIG. 1 schematically shows the structure of a gasoline engine 1 to which a valve actuation control apparatus of the embodiment is applied.

A cylinder block 2 of the engine 1 includes a plurality of cylinders 3 (only one is shown in FIG. 1). A piston 4 is received in each of the cylinders 3. The piston 4 is connected to a crankshaft 5 through a connecting rod 6. The connecting rod 6 converts the reciprocation of the piston 4 to the rotation of the crankshaft 5.

A cylinder head 7 is attached to an upper portion of the cylinder block 2. In each cylinder 3, a combustion chamber 8 is defined between an upper end of the piston 4 and the cylinder head 7.

A spark plug 11 is provided in each of the combustion chambers 8. An intake port 12 and an exhaust port 13 are disposed in correspondence with each combustion chamber 8. The intake port 12 and the exhaust port 13 are connected respectively to an intake passage 14 and an exhaust passage 15. An injector 16 is provided in correspondence with each combustion chamber 8 and formed in the corresponding intake port 12. The injector 16 injects fuel into the corresponding combustion chamber 8.

An intake valve 17 and an exhaust valve 18 are provided in correspondence with each of the combustion chambers 8 for selectively opening or closing the intake port 12 and the exhaust port 13, respectively. An intake camshaft 31 and an exhaust camshaft 32 are deployed respectively in correspondence with the intake valve 17 and the exhaust valve 18. The intake camshaft 31 and the exhaust camshaft 32 each include a cam (not illustrated). When the intake camshaft 31 is rotated, the intake valve 17 is selectively opened or closed by the cam rotating with the intake camshaft 31. Likewise, when the exhaust camshaft 32 is rotated, the exhaust valve 18 is selectively opened or closed by the cam rotating with the exhaust camshaft 32. A timing pulley 33 is formed at a distal end of the intake camshaft 31, and a timing pulley 34 is formed at a distal end of the exhaust camshaft 32. The timing pulleys 33, 34 are operationally connected to the crankshaft 5 through a timing belt 35. If the crankshaft 5 is rotated two cycles, each of the timing pulleys 33, 34 is rotated one cycle. When the engine 1 is operated, the rotation of the crankshaft 5 is transmitted to the intake camshaft 31 and the exhaust camshaft 32 through the timing belt 35 and the timing pulleys 33, 34. In this manner, the intake valve 17 and the exhaust valve 18 are selectively opened or closed at predetermined timings when the crankshaft 5 is rotated, or the piston 4 is reciprocated.

A crank angle sensor 41 is disposed in the vicinity of the crankshaft 5 for detecting the rotational phase (the displacement angle) of the crankshaft 5. In accordance with the detection, the engine speed NE of the engine 1 (the rotation speed of the crankshaft 5) is obtained. An intake cam angle sensor 42$a$ is arranged in the vicinity of the intake camshaft 31. Based on the output signals generated by the intake cam angle sensor 42$a$ and the crank angle sensor 41, the rotational phase (the cam angle) of the intake camshaft 31 is obtained. Likewise, an exhaust cam angle sensor 42$b$ is deployed in the vicinity of the exhaust camshaft 32. Based on the output signals generated by the exhaust cam angle sensor 42$b$ and the crank angle sensor 41, the rotational phase (the cam angle) of the exhaust camshaft 32 is obtained.

An igniter 46 applies high voltage to each of the spark plugs 11. The timing at which each spark plug 11 is activated is determined depending on the timing at which the igniter 46 applies the high voltage to the spark plug 11. The spark plug 11 ignites a mixture of the intake air supplied from the intake passage 14 and the fuel injected by the injector 16 in the corresponding combustion chamber 8. The air-fuel mixture is thus combusted in the combustion chamber 8 for generating drive force for the engine 1. Meanwhile, the gas produced by the combustion is discharged into the exhaust passage 15.

A surge tank 51 is formed in a portion of the intake passage 14 for suppressing pulsation of the intake air. A throttle valve 53 is arranged in the intake passage 14 at a position upstream from the surge tank 51. The opening size of the throttle valve 53 is changed depending on the operation of an accelerator pedal 52. In this manner, the amount of the intake air supplied to each combustion chamber 8 is adjusted. A throttle valve opening size sensor 54 and an idle switch 55 are disposed in the vicinity of the throttle valve 53. The throttle valve opening size sensor 54 detects the opening size of the throttle valve 53. The idle switch 55 is turned on when the throttle valve 53 is fully closed. An air flow meter 56 is provided at a position upstream from the throttle valve 53. The air flow meter 56 generates an output corresponding to the intake air amount Qa of the engine 1.

In the illustrated embodiment, an intake valve timing varying mechanism 60$a$ is formed in the timing pulley 33 of each camshaft 31. Further, an exhaust valve timing varying mechanism 60$b$ is formed in the timing pulley 34 of each exhaust camshaft 32.

The intake valve timing varying mechanism 60$a$ changes the rotational phase of the timing pulley 33 and the intake camshaft 31 relative to the crankshaft 5 using hydraulic pressure. This varies the valve timing of the intake valve 17 in a continuous manner. Likewise, the exhaust valve timing varying mechanism 60$b$ changes the rotational phase of the timing pulley 34 and the exhaust camshaft 32 relative to the crankshaft 5 using hydraulic pressure. This varies the valve timing of the exhaust valve 18 in a continuous manner. More specifically, the intake valve timing varying mechanism 60$a$ includes an advancing oil passage P1$a$ and a retarding oil passage P2$a$. The intake valve timing varying mechanism 60$a$ receives oil from the advancing oil passage P1$a$ when advancing the rotational phase of the intake camshaft 31 relative to the timing pulley 33 but from the retarding oil passage P2$a$ when retarding such rotational phase. In the same manner, the exhaust valve timing varying mechanism 60$b$ includes an advancing oil passage P1$b$ and a retarding oil passage P2$b$.

The exhaust valve timing varying mechanism 60$b$ receives oil from the advancing oil passage P1$b$ when advancing the rotational phase of the exhaust camshaft 32 relative to the timing pulley 34 but from the retarding oil passage P2$b$ when retarding the rotational phase. The oil is retained in an oil pan 65 and pumped by an oil pump 62. The oil pump 62 then supplies the oil to a pair of oil control valves (hereinafter, referred to as "OCVs") 63$a$, 63$b$. The OCV 63$a$ sends the oil to the advancing oil passage P1$a$ or the retarding oil passage P2$a$ selectively. The OCV 63$b$ sends the oil to the advancing oil passage P1$b$ or the retarding oil passage P2$b$ selectively. Each of the OCVS 63$a$, 63$b$ is a so-called linear solenoid valve and incorporates an electromagnetic valve. Each OCV 63$a$, 63$b$ changes the duty ratio of voltage supplied to the electromagnetic solenoid for selecting the oil passage to which the oil is supplied and the speed at which the oil is sent. In this manner, each OCV 63$a$, 63$b$ supplies the oil to the selected oil passage at a selected speed. This changes the rotational phase of the intake camshaft 31 and that of the exhaust camshaft 32 relative to the crankshaft 5, thus varying the valve timing of the intake valve 17 and that of the exhaust valve 18.

A control apparatus 80 (an ECU) controls the ignition timing and fuel injecting amount of the engine 1, as well as the valve timings of the intake valve 17 and the exhaust valve 18 based on controlling of the rotational phase by means of the corresponding valve timing mechanisms. A control apparatus 80 deal with the intake valve 17 as a first valve and the exhaust valve as a second valve. The main component of the control apparatus 80 is a microcomputer having a central processing unit (CPU). The control apparatus 80 includes, for example, a read only memory (ROM) and a random access memory (RAM). The ROM pre-stores various programs and maps and the RAM temporarily stores the computation results obtained by the CPU. Further, the control apparatus 80 is provided with a backup RAM for continuously storing the computation results and the pre-stored data after the engine 1 is stopped, as well as an input interface and an output interface. The crank angle sensor 41, the intake cam angle sensor 42$a$, the exhaust cam angle sensor 42$b$, a coolant temperature sensor 43, the throttle valve opening size sensor 54, the idle switch 55, and the air flow meter 56 each input an output signal to the control apparatus 80 via the input interface. The control apparatus 80 detects the operational state of the engine 1 according to the output signals of the sensors 41 to 43 and the sensors 54 to 56.

The output interface is connected to the injector 16, the igniter 46, and the OCVs 63$a$, 63$b$ through corresponding drivers.

The control apparatus 80 preferably controls the injector 16, the igniter 46, the OCV 63$a$ (the intake valve timing varying mechanism 60$a$), and the OCV 63$b$ (the exhaust valve timing varying mechanism 60$b$) with reference to the programs and initial data stored by the ROM, according to the output signals of the sensors 41 to 43 and the sensors 54 to 56.

Next, controlling of the spark timing of the engine 1 and controlling of the valve timing of each of the intake valve 17 and the exhaust valve 18, which are performed by the control apparatus 80, will be explained in detail respectively.

[Controlling of Spark Timing]

The control apparatus 80 controls the spark timing of the engine 1 using a spark timing instruction ST. The spark timing instruction ST is obtained by the following equation (1):

$$ST = SR + F - AG \qquad (1)$$

ST: Spark Timing Instruction
SR: Most Advanced Spark Timing
F: Feedback Correcting Value
AG: KCS Learned Value In the equation (1), the most advanced Spark Timing SR corresponds to a spark timing advanced by a predetermined margin from a spark timing advanced to a state immediately before knocking is caused (knock limit). The most advanced Spark Timing SR is varied depending on the engine operational state such as the engine speed NE and the engine load L.

The engine speed NE is determined according to a detection signal generated by the crank angle sensor 41. The engine load L is computed in accordance with the intake air amount Qa, detected by the air flow meter 56, and the engine speed NE. As a parameter corresponding to the intake air amount Qa, an intake air pressure determined according to a detection signal of a vacuum sensor provided in the intake passage 14, or a throttle opening size obtained according to a detection signal of the throttle valve opening size sensor 54, or an accelerator pedal depressed amount determined according to a detection signal of an accelerator pedal position sensor may be used.

In the equation (1), the feedback correcting value F and the KCS learned value AG are correcting values for retarding the spark timing for suppressing knocking if the knocking occurs. These values are increased or decreased depending on the state of the knocking, or whether or not the knocking occurs.

That is, if the knocking occurs, the feedback correcting value F is changed such that the spark timing instruction ST is retarded. Without the knocking, the feedback correcting value F is changed such that the spark timing instruction ST is advanced.

The KCS learned value AG is adjusted such that the feedback correcting value F is maintained in a predetermined range. As the value AG, for example, a total of a knocking correcting learned value and a low load learned value is employed. The knocking learned value is adjusted such that the feedback correcting value F is maintained in the predetermined range over the entire load range of the engine 1. The low load learned value is adjusted such that the feedback correcting value F is maintained in the predetermined range when the engine 1 is in a relatively low load range.

If the feedback correcting value F is out of the predetermined range such that the spark timing instruction ST is retarded, the KCS learned value AG is changed such that the instruction ST is retarded. If the feedback correcting value F is out of the predetermined range such that the spark timing instruction ST is advanced, the KCS learned value AG is changed such that the instruction ST is advanced. As long as the engine 1 is in the relatively low load range, the change of the KCS learned value AG is brought about by adjusting both of the knocking correcting value and the low load correcting value. However, when the engine 1 is in a range other than the relatively low load range, the KCS learned value AG is changed by adjusting only the knocking correcting value.

[Controlling of Valve Timing]

The control apparatus 80 controls the valve timing of the intake valve 17 by controlling the intake valve timing varying mechanism 60a. More specifically, the intake valve timing varying mechanism 60a is operated such that the actual valve timing of the intake valve 17 approaches a target valve timing. The actual valve timing of the intake valve 17 corresponds to an actual intake angle VTin, which is the actual displacement angle of the intake camshaft 31. The target valve timing of the intake valve 17 corresponds to a target intake angle VTTin, that is a target displacement angle of the intake camshaft 31.

The control apparatus 80 controls the valve timing of the exhaust valve 18 by controlling the exhaust valve timing varying mechanism 60b. More specifically, the exhaust valve timing varying mechanism 60b is operated such that the actual valve timing of the exhaust valve 18 approaches a target valve timing. The actual valve timing of the exhaust valve 18 corresponds to an actual exhaust angle VTex, which is the actual displacement angle of the exhaust camshaft 32. The target valve timing of the exhaust valve 18 corresponds to a target exhaust angle VTTex, which is a target displacement angle of the exhaust camshaft 32.

In this controlling, the displacement angle of the intake or exhaust camshaft 31, 32 corresponds to the rotational phase of the corresponding camshaft 31, 32 relative to the crankshaft 5. The displacement angle is converted to a crank angle (indicated with unit "degree CA").

The actual intake angle VTin is determined according to detection signals of the crank angle sensor 41 and the intake cam angle sensor 42a. When the valve timing of the intake valve 17 is maximally retarded, the actual intake angle VTin corresponds to a reference value, that is "0 degrees CA". That is, the actual intake angle VTin indicates the advanced amount of the valve timing of the intake valve 17 with respect to the maximally retarded state.

The actual exhaust angle VTex is determined according to detection signals of the crank angle sensor 41 and the exhaust cam angle sensor 42b. When the valve timing of the exhaust valve 18 is maximally advanced, the actual exhaust angle VTex corresponds to a reference value, that is "0 degrees CA". That is, the actual exhaust angle VTex indicates the retarded amount of the valve timing of the exhaust valve 18 with respect to the maximally advanced state.

Figure 2:
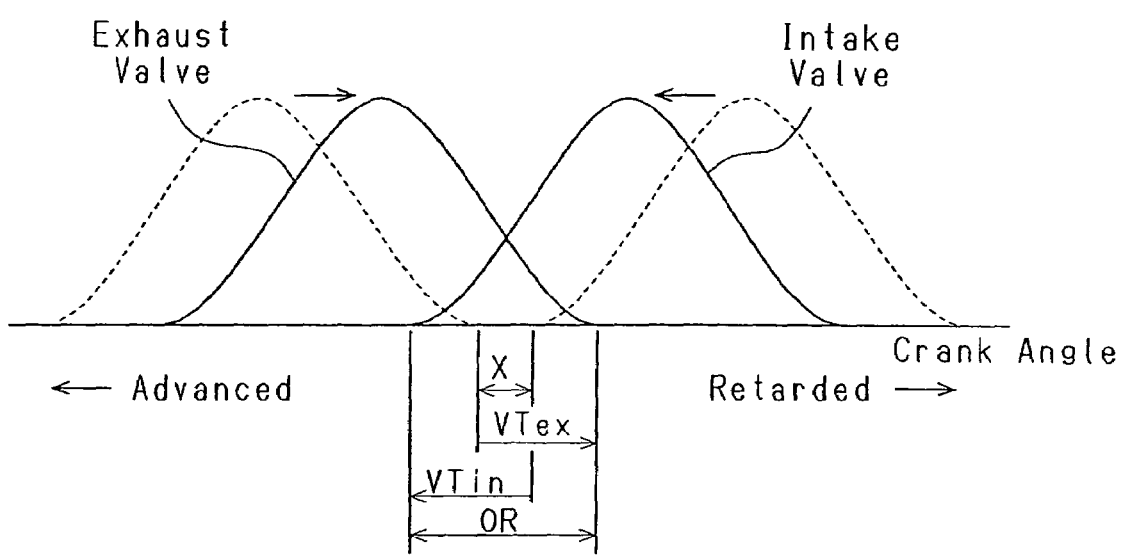
FIG. 2 is a graph indicating the relationship between valve overlapping amount and displacement angle of each of an intake valve and an exhaust valve incorporated in the engine 1.
Figure 3:
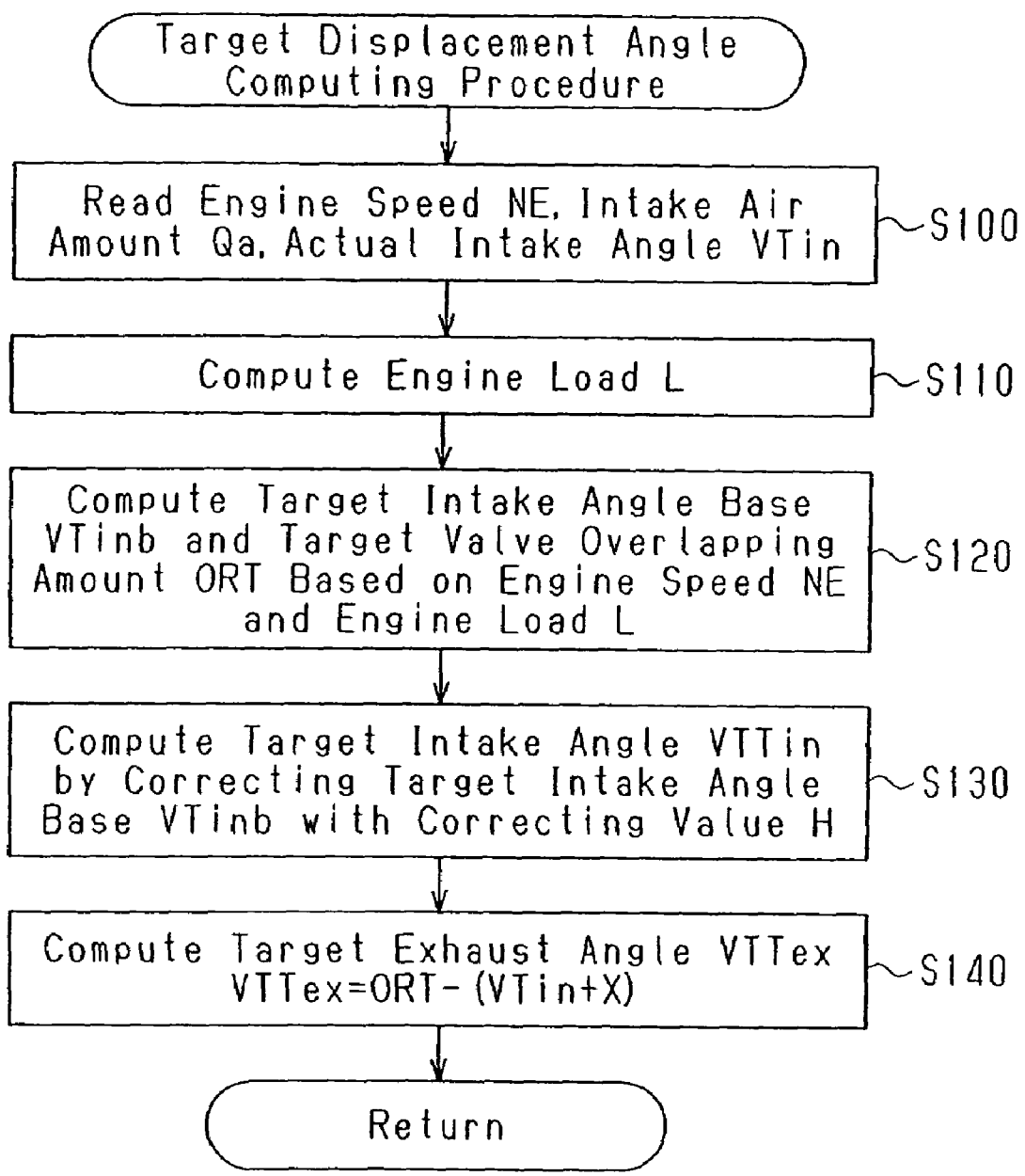
FIG. 3 is a flowchart indicating a procedure for computing a target displacement angle, executed by the apparatus of FIG. 1.

With reference to the timing chart of FIG. 2, which indicates the valve timings of the intake valve 17 and the exhaust valve 18 with respect to the change of the crank angle, the relationship between the displacement angle of the intake valve 17 or the exhaust valve 18 and the valve overlapping amount will now be explained.

The valve overlapping amount is a value corresponding to the changing amount of the crank angle from when the intake valve 17 is opened to when the exhaust valve 18 is closed. If the intake valve 17 is opened when the changing amount of the crank angle reaches "θ" after the exhaust valve 18 is closed, the valve overlapping amount corresponds to "−θ". If the actual intake angle VTin and the actual exhaust angle VTex are both zero degrees CA, as indicated by the broken lines in FIG. 2, the valve overlapping amount corresponds to an initial value X (in this embodiment, "−24 degrees CA", for example). Therefore, the actual valve overlapping amount OR is indicated by the following equation (2), using the actual intake angle VTin, the actual exhaust angle VTex, and the initial value X:

$$OR = VTin + VTex + X \quad (2)$$

OR: Actual Valve Overlapping Amount
VTin: Actual Intake Angle
VTex: Actual Exhaust Angle
X: Initial Value of Valve Overlapping Amount With reference to the flowchart of FIG. 3, a procedure for computing the target intake angle VTTin of the intake valve 17 and the target exhaust angle VTTex of the exhaust valve 18, that is a target displacement angle computing procedure, will be explained. The control apparatus 80 executes the computing procedure as an interrupting procedure at, for example, predetermined crank angles. The procedure is performed by a first computing portion of the control apparatus 80.

First, in step S100, the control apparatus 80 reads the engine speed NE computed according to an output signal of the crank angle sensor 41, the intake air amount Qa calculated according to an output signal of the air flow meter 56, and the actual intake angle VTin.

The control apparatus 80 then obtains the engine load L based on the engine speed NE and the intake air amount Qa in step S110.

In the subsequent step S120, a target valve overlapping amount ORT and a target intake angle base VTinb are determined according to the engine speed NE and the engine load L, with reference to the corresponding map stored in the ROM of the control apparatus 80.

Further, in step S130, the control apparatus 80 obtains a final target value, that is the target intake angle VTTin, based on the target intake angle base VTinb and a predetermined correcting value H, using the following equation (3). The correcting value H is a total of a first correcting value H1 and a second correcting value H2, which will be described later. Additional correcting values may be added as needed.

$$VTTin = VTinb - H \quad (3)$$

VTTin: Target Intake Angle
VTinb: Target Intake Angle Base
H: Correcting Value
  H1: First Correcting Value
  H2: Second Correcting Value Next, in step S140, the control apparatus 80 computes the target exhaust angle VTTex according to the target valve overlapping amount ORT and the actual intake angle VTin, using the following equation (4):

$$VTTex = ORT - (VTin + X) \quad (4)$$

VTTex: Target Exhaust Angle
ORT: Target Valve Overlapping Amount
VTin: Actual Intake Angle
X: Initial Value of Valve Overlapping Amount The equation (4) is obtained by modifying the aforementioned equation (2), which represents the relationship between the actual camshaft angles VTin, VTex and the valve overlapping amount OR. That is, the valve overlapping amount OR of the equation (2) corresponds to the target valve overlapping amount ORT of the equation (4), and the actual exhaust angle VTex of the equation (2) corresponds to the target exhaust angle VTTex of the equation (4).

Afterwards, the procedure from step S100 to step S140 is executed repeatedly at predetermined time intervals.

The intake valve timing varying mechanism 60a is controlled such that the actual intake angle VTin becomes the target intake angle VTTin, which is obtained in accordance with the procedure. More specifically, the controlling is performed by setting the duty ratio of the voltage supplied to the OCV 63a in correspondence with the margin between the actual intake angle VTin and the target intake angle VTTin. The target intake angle VTTin is thus achieved. The exhaust valve timing varying mechanism 60b is controlled in a similar manner.

Hereafter, the operation of the valve actuation control apparatus 80 of the illustrated embodiment according to the procedure for computing the target displacement angles will be explained.

Figure 4A:
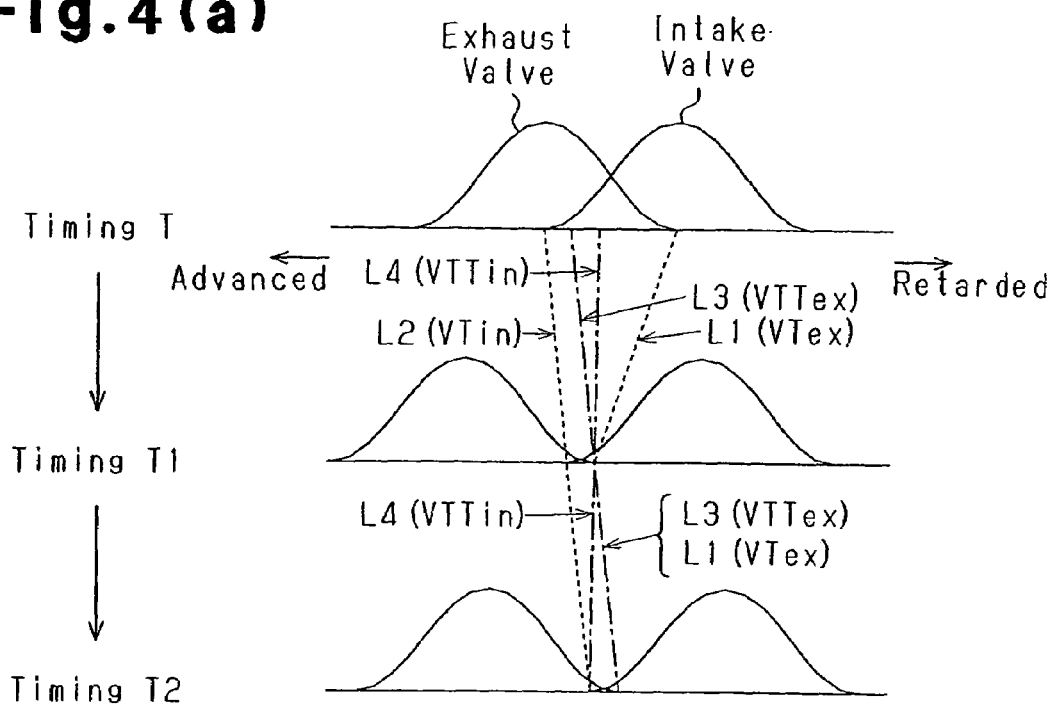
FIGS. 4(a) and 4(b) are timing charts each showing an example of controlling of the valve overlapping amount by the apparatus of FIG. 1.

FIG. 4(a) shows an example of the valve timing controlling in which the actual intake angle VTin is retarded and the valve timing of the exhaust valve 18 is advanced for reducing the valve overlapping amount between the intake valve 17 and the exhaust valve 18. In the drawing, the broken line L1 indicates variation of the closing timing of the exhaust valve 18 corresponding to the actual exhaust angle VTex of the exhaust camshaft 32. The broken line L2 indicates variation of the opening timing of the intake valve 17 corresponding to the actual intake angle VTin of the intake camshaft 31. The dotted line L3 indicates variation of the target exhaust angle VTTex. The dotted line L4 indicates variation of the target intake angle VTTin.

At timing T, a request for the aforementioned controlling, in which the actual intake angle VTin is retarded and the valve timing of the exhaust valve 18 is advanced for reducing the valve overlapping amount, is generated. At this stage, according to the computing procedure, the target intake angle VTTin is calculated as a value retarded with respect to the current actual intake angle VTin, and the target valve overlapping amount ORT is determined as a value smaller than the current actual overlapping amount OR.

The target exhaust angle VTTex is then obtained in correspondence with the target overlapping amount ORT and the current actual intake angle VTin. The actual intake angle VTin is advanced with respect to the target intake angle VTTin at this time. The obtained target exhaust angle VTTex is advanced with respect to the goal of the controlling. The obtained target exhaust angle VTTex is the final target displacement angle of the exhaust camshaft 32, which corresponds to the target intake angle VTTin and the target valve overlapping amount ORT.

In accordance with the computed target intake angle VTTin and target exhaust angle VTTex, controlling of the intake valve timing varying mechanism 60a and the exhaust valve timing varying mechanism 60b is started. Adjustment of the actual intake angle VTin and the actual exhaust angle VTex is thus started. More specifically, the actual intake angle VTin is gradually retarded while the actual exhaust angle VTex is gradually advanced. In correspondence with the gradual retarding of the actual intake angle VTin, the target exhaust angle VTTex is also gradually retarded. Even after the actual exhaust angle VTex reaches the target exhaust angle VTTex, the phase of the exhaust camshaft 32 is continuously adjusted unless the phase adjustment of the intake camshaft 31 is completed.

In this manner, the phase adjustment, that is the angle advancing, of the exhaust camshaft 32 is continued until the actual exhaust angle VTex corresponds to the target exhaust angle VTTex at timing T1. At this stage, the required valve overlapping amount is achieved prior to the completion of the phase adjustment of the intake camshaft 31.

Afterwards, the actual intake angle VTin is continuously retarded until the actual intake angle VTin corresponds to the target intake angle VTTin at timing T2. Meanwhile, the target exhaust angle VTTex is continuously retarded, such that the required valve overlapping amount is maintained.

Figure 4B:
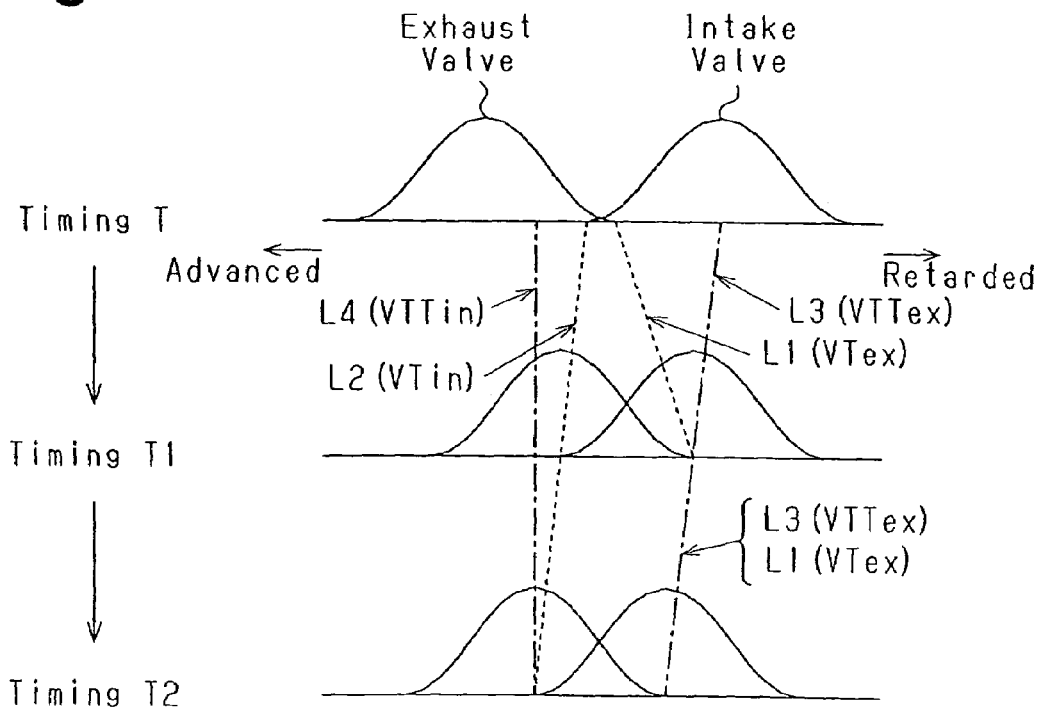

FIG. 4(b) shows an example of the valve timing controlling in which the actual intake angle VTin is advanced and the valve timing of the exhaust valve 18 is retarded for increasing the valve overlapping amount between the intake valve 17 and the exhaust valve 18. At timing T, a request for the aforementioned controlling is generated. At this stage, according to the computing procedure, the target intake angle VTTin is calculated as a value advanced with respect to the current actual intake angle VTin, and the target valve overlapping amount ORT is determined as a value increased from the current actual overlapping amount OR.

The target exhaust angle VTTex is then obtained according to the target overlapping amount ORT and the current actual intake angle VTin. The actual intake angle VTin is retarded with respect to the target intake angle VTTin at this point. The obtained target exhaust angle VTTex is retarded with respect to the goal of the controlling. The final target displacement angle of the exhaust camshaft 32, which corresponds to the target intake angle VTTin and the target valve overlapping amount ORT.

In accordance with the computed target intake angle VTTin and target exhaust angle VTTex, controlling of the intake valve timing varying mechanism 60a and the exhaust valve timing varying mechanism 60b is started. Adjustment of the actual intake angle VTin and the actual exhaust angle VTex is thus started. More specifically, the actual intake angle VTin is gradually advanced while the actual exhaust angle VTex is gradually retarded. In correspondence with the gradual advancing of the actual intake angle VTin, the target exhaust angle VTTex is also gradually advanced. In this manner, the phase adjustment, that is the angle retarding, of the exhaust camshaft 32 is continued until the actual exhaust angle VTex corresponds to the target exhaust angle VTTex at timing T1. At this stage, the required valve overlapping amount is achieved prior to the completion of the phase adjustment of the intake camshaft 31.

Afterwards, the actual intake angle VTin is continuously advanced until the actual intake angle VTin corresponds to the target intake angle VTTin at timing T2. Meanwhile, the target exhaust angle VTTex is continuously advanced, such that the required valve overlapping amount is maintained.

As has been described, according to the computing procedure, the valve timing adjustment of the intake valve 17 does not necessarily have to be completed for achieving the required valve overlapping amount.

Further, according to the procedure, the target exhaust angle VTTex is always set to a value at which the required valve overlapping amount is achieved in correspondence with the actual intake angle VTin. Accordingly, during the phase adjustment of the intake and exhaust camshafts 31, 32, the actual valve overlapping amount is continuously changed toward the target valve overlapping amount ORT.

Now, a procedure for computing the first correcting value H1, which is executed by the control apparatus 80, will be described.

[Procedure for Computing First Correcting Value]

The valve overlapping amount (the internal EGR amount) is adjusted to an optimal value set selectively for, for example, improving the engine power or decreasing the exhaust emission and fuel consumption, depending on the engine operational state. Thus, when the spark timing is retarded for suppressing knocking, the optimal value of the valve overlapping amount may be greatly decreased or maintained substantially unchanged, depending on the engine operational state. In the following, the state in which the optimal value of the valve overlapping amount is greatly decreased, or [engine operational state 1], and the state in which the optimal value of the valve overlapping amount maintains substantially unchanged, or [engine operational state 2], will be explained respectively.

[Engine Operational State 1]

The engine operational state 1 corresponds to a state in which controlling of the engine 1 focuses on, for example, reduction of the exhaust emission and of the fuel consumption and is brought about in the relatively low load range of the engine 1. In this state, the actual internal EGR amount is adjusted to a maximum value for reducing the exhaust emission and fuel consumption. Generally, the maximum value of the actual internal EGR amount is decreased as the spark timing is retarded for suppressing knocking. Therefore, for suppressing knocking, the valve overlapping amount, which is a parameter for controlling the internal EGR amount, must also be decreased. The optimal value of the valve overlapping amount is thus decreased as the spark timing is retarded for suppressing knocking. In this case, the actual valve overlapping amount becomes larger than the optimal value of the valve overlapping amount. The actual internal EGR amount in each cylinder becomes excessively large, which may disadvantageously affect the fuel consumption and the torque variation.

[Engine Operational State 2]

This state corresponds to a state in which controlling of the engine 1 focuses on, for example, improvement of the engine power and is brought about in a relatively high load range of the engine 1. In this state, the optimal value of the valve overlapping amount is smaller than a value maximizing the internal EGR amount according to the current engine operational state. Generally, as the internal EGR amount is increased, the (exhaust) gas in the combustion chamber 8, which does not contribute to the combustion of the engine 1, is increased. Therefore, if the internal EGR amount is maximized, the engine power may be lowered. In other words, if the engine 1 is operated in this engine operational state and, particularly, the throttle valve 53 is substantially fully open, the controlling focuses on maximization of the intake air amount, rather than maximization of the internal EGR amount. The corresponding optimal value of the valve overlapping amount is thus set to a value maximizing the intake air amount. Accordingly, the optimal amount of the valve overlapping amount of this state is smaller than the value maximizing the internal EGR amount.

Thus, in this [Engine Operational State 2], as long as the valve overlapping amount corresponds to the optimal value of the valve overlapping amount, the actual internal EGR amount is maintained as a value smaller than the maximum value, regardless of retarding of the spark timing. That is, regardless of the retarded spark timing, the actual internal EGR amount does not become excessively great. Thus, the valve overlapping amount, which serves as a parameter for controlling the internal EGR amount, does not have to be decreased. Further, the optimal value of the valve overlapping amount is not greatly changed even when the spark timing is retarded.

As has been described in [Engine Operational State 1], if the spark timing is retarded for suppressing knocking, the actual valve overlapping amount thus becomes larger than the optimal value of the valve overlapping amount, leading to excessive increase of the internal EGR amount. To solve this problem, the valve overlapping amount may be reduced with a correcting value used when retarding the spark timing, which is, for example, the KCS learned value AG. If the KCS learned value AG is used in [Engine Operational State 1], the internal EGR amount may be prevented from becoming excessively large, thus suppressing disadvantageous effects on the fuel consumption and torque variation. However, if the KCS learned value AG is used in [Engine Operational State 2], the valve overlapping amount may become smaller than the optimal value of the valve overlapping amount, such that the internal EGR amount may become excessively small.

Therefore, in the illustrated embodiment, a guard value G is employed for restricting an upper limit of the valve overlapping amount. The guard value G is set according to the KCS learned value AG and the engine load L. The guard value G is thus allowed to restrict the upper limit of the valve overlapping amount such that the internal EGR amount does not become excessively great when the spark timing is retarded.

Figure 5A:
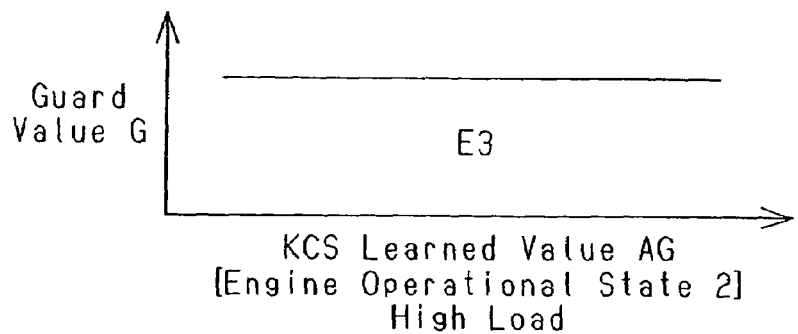
FIGS. 5(a) and 5(b) are graphs each indicating KCS learned value AG versus guard value G for a high load operational state and a low load operational state of the engine 1, respectively, in terms of controlling by the apparatus of FIG. 1.
Figure 5B:
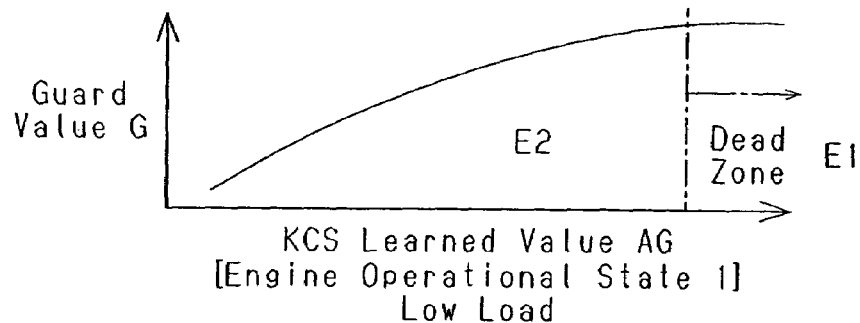

With reference to FIG. 5(b), the guard value G is varied according to the KCS learned value AG in the relatively low load range of the engine 1 in which [Engine Operational State 1] may be brought about. As is clear from the graph, the guard value G corresponding to [Engine Operational State 1] is set to a smaller value as the KCS learned value AG becomes smaller. With reference to FIG. 5(a), in the relatively high load range of the engine 1 in which [Engine Operational State 2] may be brought about, the guard value G corresponding to [Engine Operational State 2] is maintained as a relatively large value, regardless of the KCS learned value AG.

More specifically, in [Engine operational State 1], if knocking occurs and the KCS learned value AG is set to a predetermined value, the actual optimal value of the valve overlapping amount is decreased. The actual valve overlapping amount thus becomes larger than the optimal value of the valve overlapping amount. In this state, the valve overlapping amount is larger than the guard value G. However, the actual valve overlapping amount is reduced by the upper limit restriction with the guard value G. The internal EGR amount is thus prevented from becoming excessively great.

In contrast, in [Engine Operational State 2], the optimal value of the valve overlapping amount is maintained substantially constant, regardless of the change of the KCS learned value AG caused by the knocking. That is, the actual valve overlapping amount does not become larger than the optimal value of the valve overlapping amount. In this state, the actual valve overlapping amount may be smaller than the guard value G, which is set in the aforementioned manner. If this is the case, the actual valve overlapping amount is not subjected to the upper limit restriction with the guard value G. Accordingly, the actual valve overlapping amount does not become excessively small. That is, the actual valve overlapping amount does not become smaller than a value required for stopping the internal EGR amount from becoming excessively large.

In the illustrated embodiment, the target intake angle base VTinb is corrected with the correcting value H1, for performing the upper limit restriction of the valve overlapping amount.

Figure 7:
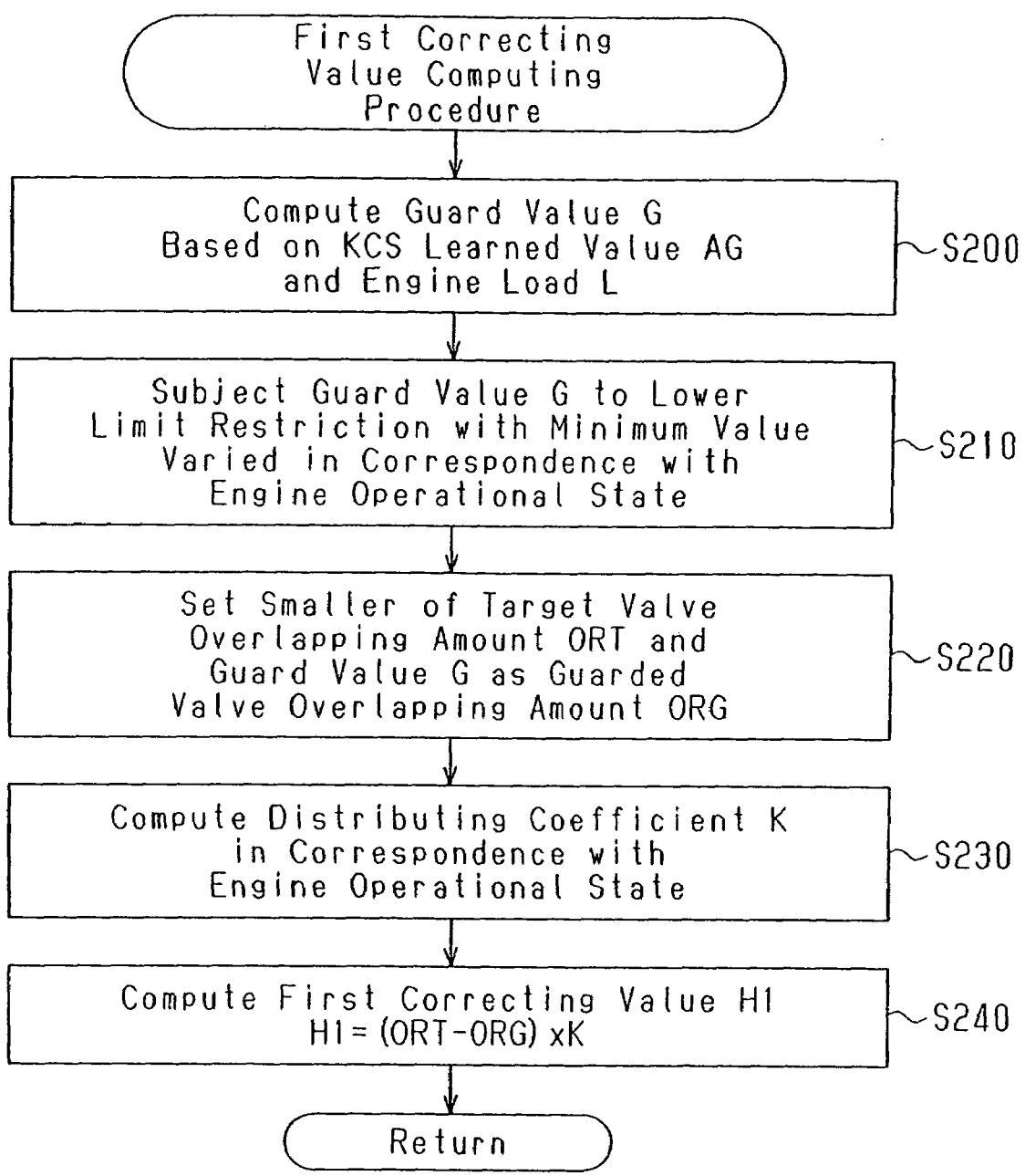
FIG. 7 is a flowchart indicating a procedure for computing a first correcting value H1, executed by the apparatus of FIG. 1.

With reference to the flowchart of FIG. 7, a procedure for computing the first correcting value H1 will be explained. The procedure is performed by the control apparatus 80 as an interrupting procedure at predetermined crank angles.

Figure 6:
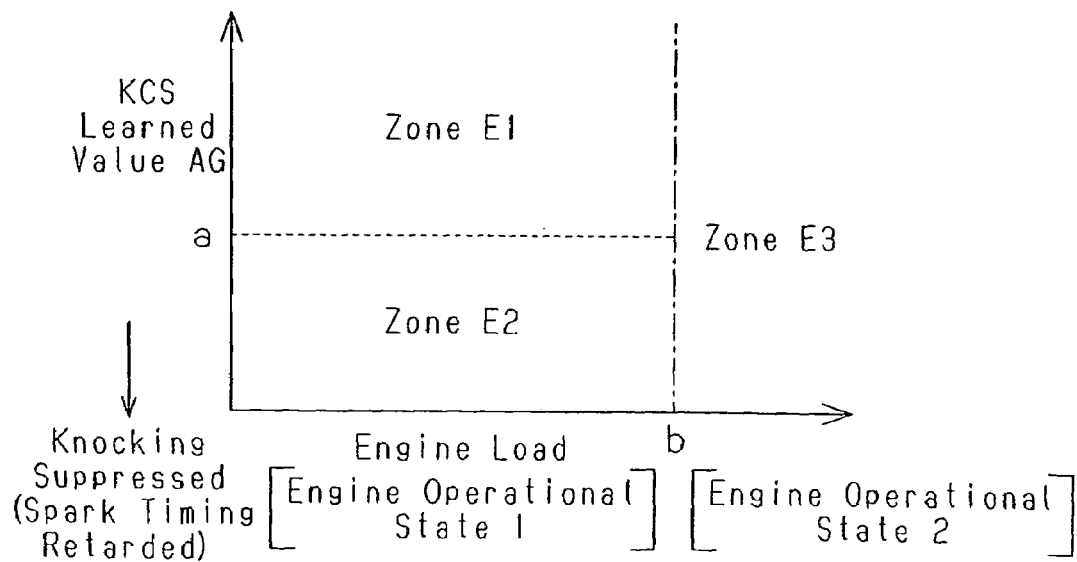
FIG. 6 is a schematic view showing a map used for calculation of the guard value G.

First, in step S200, the control apparatus 80 calculates the guard value G according to the KCS learned value AG and the engine load L, with reference to the map of FIG. 6. In the subsequent step S210, the lower limit of the guard value G is determined by a minimum value varied according to the engine speed NE and the engine load L.

Next, in step S220, between the target valve overlapping amount ORT and the guarded value G, the smaller value is set to a guarded target valve overlapping amount ORG.

The control apparatus 80 then computes a distributing coefficient K according to the engine operational state including the engine speed NE and the engine load L in step S230. The distributing coefficient K is larger than zero but smaller than 1.0. The distributing coefficient K is used for determining, or distributing, the retarding amount of the actual intake angle VTin relative to the advancing amount of the valve timing of the exhaust valve 18, when reducing the valve overlapping amount. That is, when the valve overlapping amount is reduced by the upper limit restriction with the guard value G, the retarding amount of the actual intake angle VTin is increased and the advancing amount of the actual exhaust angle VTex is decreased as the distributing coefficient K approaches "1.0".

Subsequently, in step S240, the control apparatus 80 determines the first correcting value H1 by using the following equation (5). The target intake angle base VTinb is corrected by the first correcting value H1 using the equation (3).

$$H1 = (ORT - ORG) \times K \qquad (5)$$

H1: First Correcting Value
ORT: Target Valve Overlapping Amount
ORG: Guarded Target Valve Overlapping Amount
K: Distributing Coefficient When the guard value G is smaller than the target valve overlapping amount ORT, the guard value G is set to the guarded target valve overlapping amount ORG. The target intake angle VTTin is thus decreased (advanced) in correspondence with the first correcting value H1, which is obtained using the equation (5). Therefore, the actual intake angle VTin, which is controlled based on the target intake valve VTTin, is advanced, decreasing the actual valve overlapping amount. In other words, the actual valve overlapping amount is reduced by the upper limit restriction with the guard value G.

In contrast, if the guard value G is larger than the target valve overlapping amount ORT, the target valve overlapping amount ORT is set to the guarded target valve overlapping amount ORG. The first correcting value H1 is determined as "zero" using the equation (5). If this is the case, advancing of the actual intake angle VTin is not performed. That is, the reduction of actual the valve overlapping amount by the upper limit restriction with the guard value G does not occur.

With reference to FIG. 6, the map used for computing the guard value G in step S200 will be explained.

The map corresponds to the coordinates of engine load versus KCS learned value AG. The map includes zones E1, E2, and E3. The zones E1 and E2 correspond to FIG. 5(b). The zone E3 corresponds to FIG. 5(a). In zone E1, the engine load is not larger than a predetermined value "b" and the KCS learned value AG is not smaller than a predetermined value "a". In zone E2, the engine load is not larger than the value "b" and the KCS learned value AG is smaller than the value "a". In zone E3, the engine load is larger than the value "b". If the KCS learned value AG falls in the range corresponding to zone E2 of the map, the spark timing is retarded such that knocking is decreased.

When the engine operational state corresponds to zone E1 of the map, which corresponds to the dead zone of FIG. 5(b), the guard value G is determined as a value equal to the target valve overlapping amount ORT. In this case, the guarded target valve overlapping amount ORG is equal to the target valve overlapping amount ORT. Thus, as long as the engine 1 is operated in a state corresponding to zone E1, or before the engine operational state is changed to a state corresponding to zone E2 in which the knocking may increase, the first correcting value H1 is maintained as "zero". In this state, the upper limit restriction of the actual valve overlapping amount is not performed.

If the engine operational state corresponds to zone E3 of the map, the guard value G is determined as a value equal to the target valve overlapping amount ORT, like zone E1. Thus, as long as the engine 1 is operated in the relatively high load range, which is higher than the value "b", the first correcting value H1 is maintained as "zero", as in zone E1. Accordingly, the upper limit restriction of the valve overlapping amount is not performed.

However, when the engine operational state corresponds to zone E2 of the map, the guard value G is reduced as the KCS learned value AG is decreased, or the knocking is increased, referring to FIG. 5(b). That is, in zone E2, the guard value G is varied continuously according to the KCS learned value AG.

In this manner, by correcting the target intake angle base VTinb with the first correcting value H1 using the equation (3), the actual valve overlapping amount is adjusted to the optimal value of the valve overlapping amount corresponding to the engine operational state.

Next, a procedure for computing the second correcting value H2 executed by the control apparatus 80 will be described.

[Procedure for Computing Second Correcting Value]

In the illustrated embodiment, the actual exhaust angle VTex is changed by controlling the exhaust valve timing varying mechanism 60b. However, since the controlling is restricted to a certain range, the actual exhaust angle VTex, which is the displacement angle of the exhaust camshaft 32, is also controlled in a limited range. The control range corresponds to the range from zero degrees CA to the maximally retarded valve timing. The zero degrees CA is the reference value at which the actual exhaust angle VTex is maximally advanced (see FIG. 2). Thus, the upper limit of the actual exhaust angle VTex of the exhaust camshaft 32 corresponds to the maximally retarded valve timing. The lower limit of the actual exhaust angle VTex corresponds to the maximally advanced valve timing, which is the aforementioned reference value, "zero" (see FIG. 2).

As has been described, in the illustrated embodiment, the target exhaust angle VTTex is obtained according to the actual intake angle VTin and the target valve overlapping amount ORT. The target exhaust angle VTTex may thus become larger than the upper limit of the permitted range or smaller than the lower limit of the range of the actual exhaust angle VTex. Since the actual exhaust angle VTex is restricted by the upper or lower limit, the actual exhaust angle VTex is hard to be increased exceeding the upper limit or fall below the lower limit. Hence, when the target exhaust angle VTTex becomes larger than the upper limit of the permitted range or smaller than the lower limit, the actual exhaust angle VTex is hard to achieve the target exhaust angle VTTex. The target valve overlapping amount ORT cannot be achieved.

If the target exhaust angle VTTex is set to a value smaller than the lower limit "zero" when the valve overlapping amount must be decreased, advancing of the actual exhaust angle VTex is restricted by the lower limit, prematurely. This may make it impossible to achieve the target valve overlapping amount ORT. Accordingly, the internal EGR amount may be increased exceeding the optimal amount corresponding to the engine operational state. This may lead to a problem like destabilization of the engine operation.

To solve this problem, in the illustrated embodiment, a requested displacement angle of the exhaust camshaft 32 is computed according to the target valve overlapping amount ORT and the target intake angle VTTin. The lower limit of the actual exhaust angle VTex is set to a displacement angle corresponding to the control limit of the exhaust valve timing varying mechanism 60b, which is, more particularly, the maximally advanced angle "zero". The control apparatus 80 functions as a target actuation correcting portion, which is a second computing portion. If the requested exhaust angle is smaller than the lower limit "zero", the control apparatus 80 corrects the target intake angle VTTin in correspondence with the margin between the requested displacement angle and the lower limit, using the second correcting value H2.

In this embodiment, the requested actuation value of the exhaust camshaft 32 corresponds to the resulting valve actuation, which is a value set as the target exhaust angle VTTex when the actual intake angle VTin reaches the target intake angle VTTin. If the requested actuation value is smaller than the lower limit "zero", the target intake angle VTTin is corrected in correspondence with the margin between the requested actuation value and "zero". In this manner, the target exhaust angle VTTex is prevented from being set to a value smaller than the lower limit "zero". The actual exhaust angle VTex is thus reliably adjusted to the target exhaust angle VTTex. Accordingly, also in this case, the target valve overlapping amount ORT is reliably achieved.

The procedure for computing the second correcting value H2 will now be described with reference to the flowchart of FIG. 8. The procedure is performed by the control apparatus 80 as an interrupting procedure at predetermined crank angles.

First, in step S300, the control apparatus 80 computes a corrected target intake angle VTRin, which is a corrected target displacement angle of the intake camshaft 31, based on the target intake angle base VTinb and the first correcting value H1, using the following equation (6). The corrected target intake angle VTRin corresponds to a target displacement angle of the intake camshaft 31, which is set for optimizing the valve overlapping amount in correspondence with retarding of the spark timing.

$$VTRin = VTinb - H1 \qquad (6)$$

VTRin: Corrected Target Intake Angle
VTinb: Target Intake Angle Base
H1: First Correcting Value Next, in step S310, a requested exhaust angle EXREST, which corresponds to the aforementioned requested exhaust angle, is computed in correspondence with the corrected target intake angle VTRin, the guard value G, and the initial value X, using the following equation (7).

$$EXREST = G - (VTRin + X) \qquad (7)$$

EXREST: Requested Exhaust Angle
VTRin: Corrected Target Intake Angle
X: Initial Value of Valve Overlapping Amount
G: Guard Value The equation (7) is obtained in the following manner. First, the aforementioned equation (2) representing the relationship between the actual intake angle VTin and the valve overlapping amount is modified. This modification is performed by replacing the valve overlapping amount OR in the Equation (2) with the guard value G, the actual intake angle VTin with the corrected target intake angle VTRin, and the actual exhaust angle VTex with the requested exhaust angle EXREST.

The requested exhaust angle EXREST obtained by the equation (7) corresponds to an actual exhaust angle VTex required for ensuring to obtain the guard value G with the corrected target intake angle VTRin set.

If the corrected target intake angle VTRin is set as the target intake angle VTTin for ensuring to obtain the guard value G, the actual exhaust angle VTex is adjusted in the permitted range, as long as the requested exhaust angle EXREST is equal to or larger than the lower limit "zero".

However, if the requested exhaust angle EXREST is smaller than the lower limit when the corrected target intake angle VTRin is set as the target intake angle VTTin in the aforementioned manner, the actual exhaust angle VTex cannot be adjusted to the target exhaust angle VTTex. This makes it necessary to correct the target intake angle VTTin. In this case, the margin between the requested exhaust angle EXREST and the lower limit "zero" corresponds to an unachieved amount of the adjustment of the actual exhaust angle VTex with respect to the target exhaust angle VTTex.

In other words, based on the requested exhaust angle EXREST obtained by the equation (7), it is determined whether or not the actual exhaust angle VTex can be adjusted to the target exhaust angle VTTex. Further, if the determination is negative, the requested exhaust angle EXREST indicates the unachieved adjustment amount of the actual exhaust angle VTex with respect to the target exhaust angle VTTex.

Accordingly, if the requested exhaust angle EXREST obtained by the equation (7) is equal to or larger than the lower limit "zero", the actual exhaust angle VTex can be adjusted to the target exhaust angle VTTex. In contrast, if the requested exhaust angle EXREST obtained by the equation (7) is smaller than "zero", the obtained result corresponds to the unachieved adjustment amount of the actual exhaust angle VTex with respect to the target exhaust angle VTTex.

In the equation (7), the guard value G may be replaced by the guarded target valve overlapping amount ORG. However, the guard value G corresponds to the maximum value of the target valve overlapping amount ORT. Therefore, as long as the guard value G is ensured to be obtained, the guarded target valve overlapping amount ORG is also ensured to be obtained. The equation (8) of the illustrated embodiment thus employs the guard value G instead of the guarded target valve overlapping amount ORG.

After computing the requested exhaust angle EXREST, the control apparatus 80 determines, in step S320, whether or not the requested exhaust angle EXREST is smaller than the lower limit "0". If the determination is positive (YES in step S320), the actual exhaust angle VTex cannot achieve the requested exhaust angle EXREST. The unachieved adjustment amount of the actual exhaust angle VTex (the margin between the resulting target exhaust angle VTTex and "zero") corresponds to the absolute value of the requested exhaust angle EXREST. Thus, in step S330, the absolute value of the requested exhaust angle EXREST is set to the second correcting value H2 for correcting the target intake angle VTTin.

If it is determined that the requested exhaust angle EXREST is equal to or larger than "zero" (NO in step S320), the adjustment of the actual exhaust angle VTex can achieve the requested exhaust angle EXREST. In this case, the second correcting value H2 for correcting the target intake angle VTTin is set to "zero" in step S340.

The second correcting value H2, which is obtained in the above-described manner, is reflected in the correcting value H of the equation (3). The target intake angle base VTinb is thus corrected by the first correcting value H1 and the second correcting value H2 in correspondence with the unachieved adjustment amount of the actual exhaust angle VTex.

When the requested exhaust angle EXREST is equal to or larger than "zero", the second correcting value H2 is set to "zero". In this case, the target intake angle base VTinb is corrected with only the first correcting value H1.

Figure 9A:
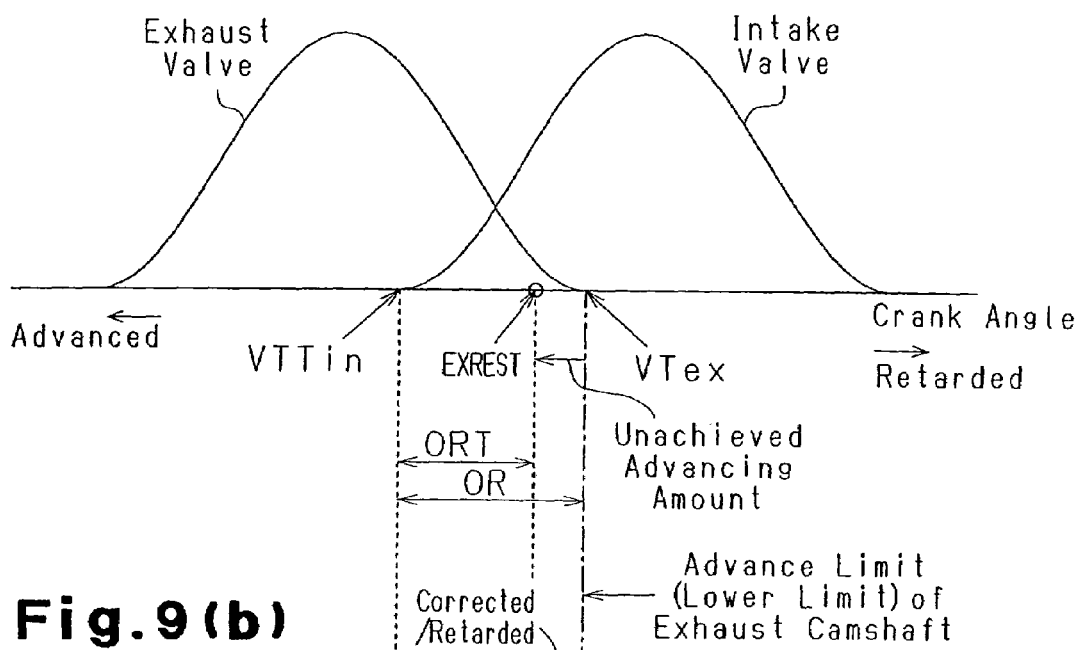
FIGS. 9(a) and 9(b) are graphs each showing an example of controlling of the valve overlapping amount by the apparatus of FIG. 1, in terms of correction of a target displacement angle of an intake camshaft.
Figure 9B:
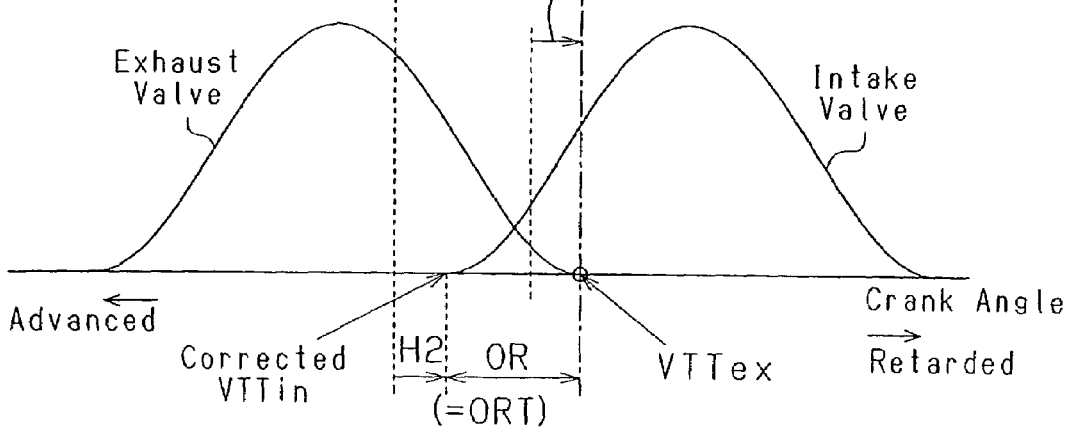

FIG. 9 shows an example of controlling of the actual valve overlapping amount OR in which the target exhaust angle VTTex is smaller than the lower limit of the actual exhaust angle VTex, which is "zero". FIG. 9(a) corresponds to the case in which the controlling does not include computation of the second correcting value H2. In contrast, FIG. 9(b) corresponds to the case in which the controlling includes the computation of the second correcting value H2.

As indicated in FIG. 9(a), if the second correcting value H2 is not employed, advancing of the actual exhaust angle VTex is unachieved with respect to the target exhaust angle VTTex advanced exceeding the lower limit "zero". The corresponding actual valve overlapping amount OR thus may become larger than the target valve overlapping amount ORT in correspondence with the unachieved advancing amount of the actual exhaust angle VTex, which is the margin between the target exhaust angle VTTex and the lower limit "zero".

In contrast, as indicated by FIG. 9(b), the second correcting value H2 is employed. The target intake angle VTTin is retarded in correspondence with the second correcting value H2, which corresponds to the unachieved advancing amount of the actual exhaust angle VTex with respect to the requested exhaust angle EXREST as shown in FIG. 9(a). The target exhaust angle VTTex is then determined from the actual intake angle VTin, which is adjusted to the target intake angle VTTin at last, and the target valve overlapping amount ORT.

The unachieved advancing amount of the actual exhaust angle VTex is thus compensated by the second correcting value H2. Accordingly, the actual exhaust angle VTex is adjusted to the target exhaust angle VTTex, which is equal to or larger than the lower limit of the actual exhaust angle VTex, and the corresponding actual valve overlapping amount OR is adjusted to the target valve overlapping amount ORT.

The illustrated embodiment has the following advantages.

(1) In the illustrated embodiment, the target exhaust angle VTTex is computed in correspondence with the target valve overlapping amount ORT and the actual intake angle VTin, which are obtained in accordance with the engine operational state. The target valve overlapping amount ORT is thus achievable even before the phase adjustment of the actual intake angle VTin and the actual exhaust angle VTex is completed. In other words, the valve overlapping amount is adjusted relatively quickly.

(2) Further, the valve overlapping amount is varied always toward the target valve overlapping amount ORT. This suppresses the undesirable variation of the valve overlapping amount in the valve timing adjustment. The engine operational stage is thus controlled further preferably during the adjustment of the actual intake angle VTin and the actual exhaust angle VTex.

(3) The upper limit of the valve overlapping amount is restricted by the guard value G. The guard value G is set according to the KCS learned value AG and the engine load L. As shown in FIG. 5(b) and FIG. 6, this makes it possible for the guard value G to restrict the upper limit of the target valve overlapping amount to a value smaller than the value at which the internal EGR amount becomes excessively large when the spark timing is retarded for suppressing knocking. In [Engine Operational State 1] as shown in FIG. 5(b), if the target valve overlapping amount ORT becomes larger than the guard value G, the target valve overlapping amount ORT is decreased by the upper limit restriction with the guard value G correspond to the spark time retarding. In this manner, the actual valve overlapping amount is restricted to the target valve overlapping amount ORT, thus suppressing excessive increase of the internal EGR amount. In contrast, in [Engine Operational State 2] as shown in FIG. 5(a), the target valve overlapping amount may become smaller than the guard value G even when the spark timing is retarded. If this is the case, the upper limit restriction of the target valve overlapping amount ORT by the guard value G is not performed. This prevents the valve overlapping amount from becoming excessively small due to the upper limit restriction for suppressing excessive increase of the internal EGR amount caused by the retarding of the spark timing.

(4) When the engine operational state corresponds to zone E2 of the map of FIG. 6, the guard value G is decreased as the KCS learned value AG is changed to a value retarding the spark timing to suppress the knocking. The guard value G is varied continuously in function with the KCS learned value AG. Accordingly, in terms of the upper restriction of the valve overlapping amount by the guard value G, the valve overlapping amount is varied smoothly by varying the guard value G in this manner.

(5) When the engine operational state corresponds to zone E1 of the map of FIG. 6 in which the retarding amount of the spark timing is relatively small, the change of the optimal (target) valve overlapping amount caused by the retarded spark timing with respect to the actual valve overlapping amount is relatively small. Thus, such change of the target valve overlapping amount is unlikely to cause a problem. In this case, the guard value G is set to a value equal to the target valve overlapping amount ORT. Accordingly, the guarded target valve overlapping amount ORG is set to the target valve overlapping amount ORT, and the item [(ORT−ORG)×K] of the equation (5) is maintained as "zero". This makes it unnecessary to perform the upper limit restriction of the valve overlapping amount when the engine operational state corresponds to zone E1. The valve overlapping amount is thus prevented from becoming excessively small due to restriction, and the internal EGR amount does not become excessively small.

(6) The lower limit of the guard value G, which is obtained referring to the FIG. 5(a), 5(b) and FIG. 6, is restricted not to become smaller than the minimum value varied according to the engine operational state. This prevents the guard value G from being set to an excessively small value. Therefore, in the upper limit restriction of the valve overlapping amount by the guard value G, the valve overlapping amount does not become excessively small.

(7) When the engine operational state corresponds to zone E3 of the map, which is the relatively high load state, the intake air amount of the engine 1 is increased. To meet the requirement, the valve overlapping amount is increased to a relatively large level. If the valve overlapping amount is subjected to the upper limit restriction by the guard value G and thus maintained as a relatively small value, the required intake air amount cannot be obtained, hampering the output performance of the engine 1. As has been described, when the intake air amount of the engine 1 is relatively large, the internal EGR amount, which is affected by the valve overlapping amount, is relatively small. It is thus unnecessary to perform the controlling for suppressing excessive increase of the internal EGR amount. Further, when the engine 1 is operated in the relatively high load state corresponding to zone E3 of the map, the guard value G is set to a value equal to the target valve overlapping amount ORT. Also, the item [(ORT−ORG)×K] of the equation (5) is maintained as null. The upper limit restriction of the valve overlapping amount is thus not performed. This prevents the valve overlapping amount from becoming excessively small, and the output performance of the engine 1 is maintained at a relatively high level.

(8) When the valve overlapping amount is subjected to the upper limit restriction by the guard value G, the valve overlapping amount is decreased by advancing the actual intake angle VTin and retarding the actual exhaust angle VTex. The ratio between the advancing amount of the actual intake angle VTin and the retarding amount of the actual exhaust angle VTex is varied in correspondence with the distributing coefficient K, which is set depending on the engine operational state. This makes it possible to set the ratio to an appropriate value according to the engine operational state. The decreasing of the valve overlapping amount is thus performed appropriately according to the engine operational state.

(9) As has been described, the guard value G is determined using the map of FIG. 6. In other words, the guard value G is selected in a manner suitable for each of the engine operational states corresponding to zones E1, E2, or E3, by using the single map.

(10) The requested exhaust angle EXREST is computed according to the guard value G, which is the maximum value of the permitted range of the target valve overlapping amount ORT, and the corrected target intake angle VTRin. If the requested exhaust angle EXREST is advanced exceeding the lower limit "zero" of the permitted range of the actual exhaust angle VTex, the margin between the requested exhaust angle EXREST corresponding to the exceeding amount and the lower limit is set as the second correcting value H2. The intake target angle base VTinb is thus corrected with the second correcting value H2, obtaining the target intake angle VTTin. This makes it possible to set the target exhaust angle VTTex to a value not smaller than the lower limit "zero". The actual exhaust angle VTex is thus adjusted to the target exhaust angle VTTex. Accordingly, the target valve overlapping amount ORT is achieved reliably.

(11) The valve timings corresponding to the control limits of the exhaust valve timing varying mechanism 60b are set as the upper and lower limits of the actual exhaust angle VTex. In other words, the exhaust valve timing varying mechanism 60b is incapable of advancing or retarding the actual exhaust angle VTex exceeding such limits. The permitted range of the actual exhaust angle VTex is set in accordance with a variable range of the exhaust valve timing varying mechanism 60b. In this regard, the limit of the permitted range of the actual exhaust angle VTex is preferably adjusted.

The present invention is not restricted to the illustrated embodiment but may be modified in the following forms.

In the illustrated embodiment, the guard value G is computed referring to the FIGS. 5(a), 5(b) and FIG. 6, according to the engine load and retarding of the spark timing for suppressing knocking. However, the guard value G may be corrected or adjusted in accordance with additional engine conditions such as the engine speed.

Instead of the map, the guard value G may be computed using an equation.

When the valve overlapping amount is decreased by the upper limit restriction with the guard value G, the decreasing rate of the valve overlapping amount may be varied in accordance with the engine operational state including the engine speed and engine load. The decreasing rate of the valve overlapping amount thus can be set to an optimal value of the valve overlapping amount corresponding to the engine operational state. That is, the valve overlapping amount is decreased in a manner suitable for the engine operational state.

In the illustrated embodiment, the guard value G is varied continuously in correspondence with the KCS learned value AG, when the engine operational state corresponds to the zone E2 of the map of FIG. 6. However, the guard value G may be varied in a stepped manner in correspondence with the KCS learned value AG.

In the illustrated embodiment, the procedure for computing the first correcting value H1 may be omitted and the guard value G of the equation (7) may be replaced by the target valve overlapping amount ORT. In this case, the computation of the first correcting value H1 is not performed, and the first correcting value H1 is set to "zero". Therefore, the corrected target intake angle VTRin becomes a value equal to the target intake angle base VTinb (see the equation (6)).

Further in the aforementioned modification omitting the first correcting value H1, the requested exhaust angle EXREST is calculated in correspondence with the target valve overlapping amount ORT and the target intake angle base VTinb. If the requested exhaust angle EXREST is smaller than the lower limit "zero", the absolute value of the requested exhaust angle EXREST is set as the second correcting value H2. The target intake angle base VTinb is then corrected with the second correcting value H2, determining the final, target intake angle VTTin. The target exhaust angle VTTex is thus set to a value equal to or larger than the lower limit "zero". It is thus possible to adjust the actual exhaust angle VTex to the target exhaust angle VTTex. Accordingly, in this modification, the target valve overlapping amount ORT is reliably achieved. Also, the advantage (11) of the illustrated embodiment is reliably obtained.

In the illustrated embodiment and above-described modifications, the lower limit (advance limit) of the target exhaust value VTTex, which corresponds to the maximally advanced angle of the actual exhaust angle VTex, is set as the lower limit of the control range of the exhaust valve timing varying mechanism 60b. And when the requested exhaust angle EXREST is advanced exceeding the lower limit, the target intake angle VTTin is retarded in correspondence with the margin between the requested exhaust angle EXREST and the lower limit.

Figure 10A:
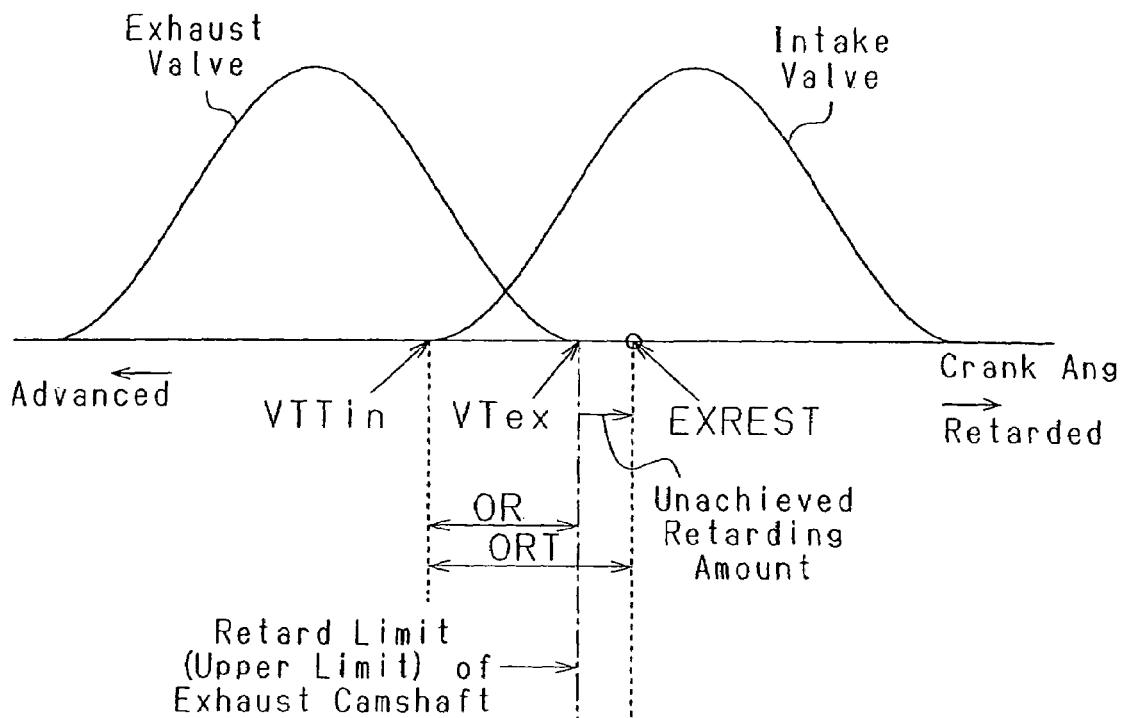
FIGS. 10(a) and 10(b) are graphs each showing an example of controlling of the valve overlapping amount by the apparatus of FIG. 1.

With reference to FIG. 10(a), the requested exhaust angle EXREST is retarded exceeding the upper limit of the control range of the exhaust valve timing varying mechanism 60b, which is the maximally retarded angle. In this case, retarding of the actual exhaust angle VTex may be unachieved in correspondence with the exceeding amount of the target exhaust angle VTTex with respect to the upper limit, which is the margin between the requested exhaust angle EXREST and the upper limit. The resulting valve overlapping amount OR may become insufficient with respect to the target valve overlapping amount ORT.

Figure 10B:
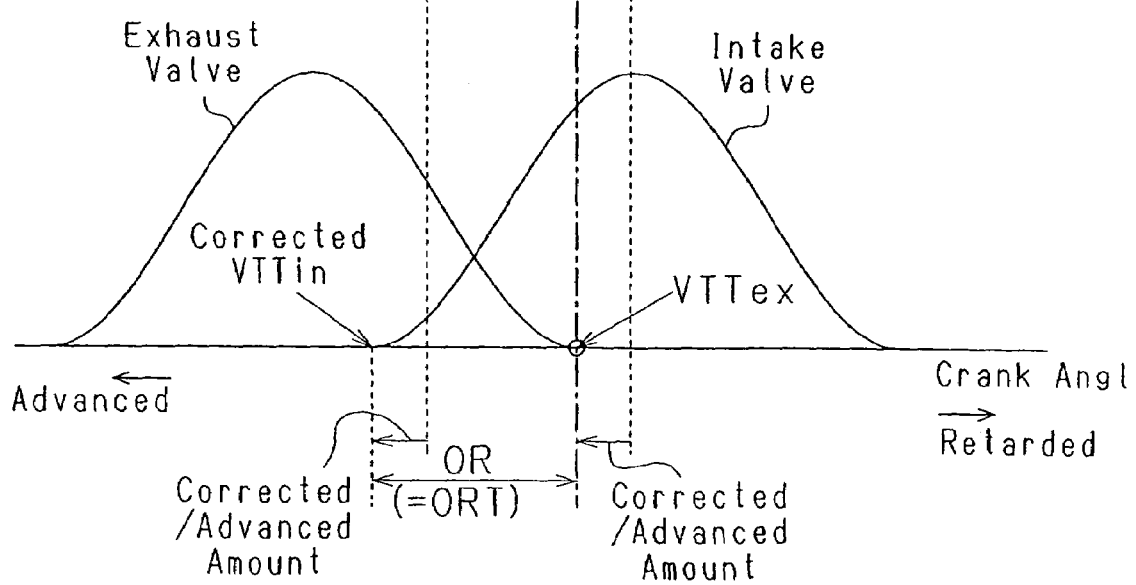
Figure 11:
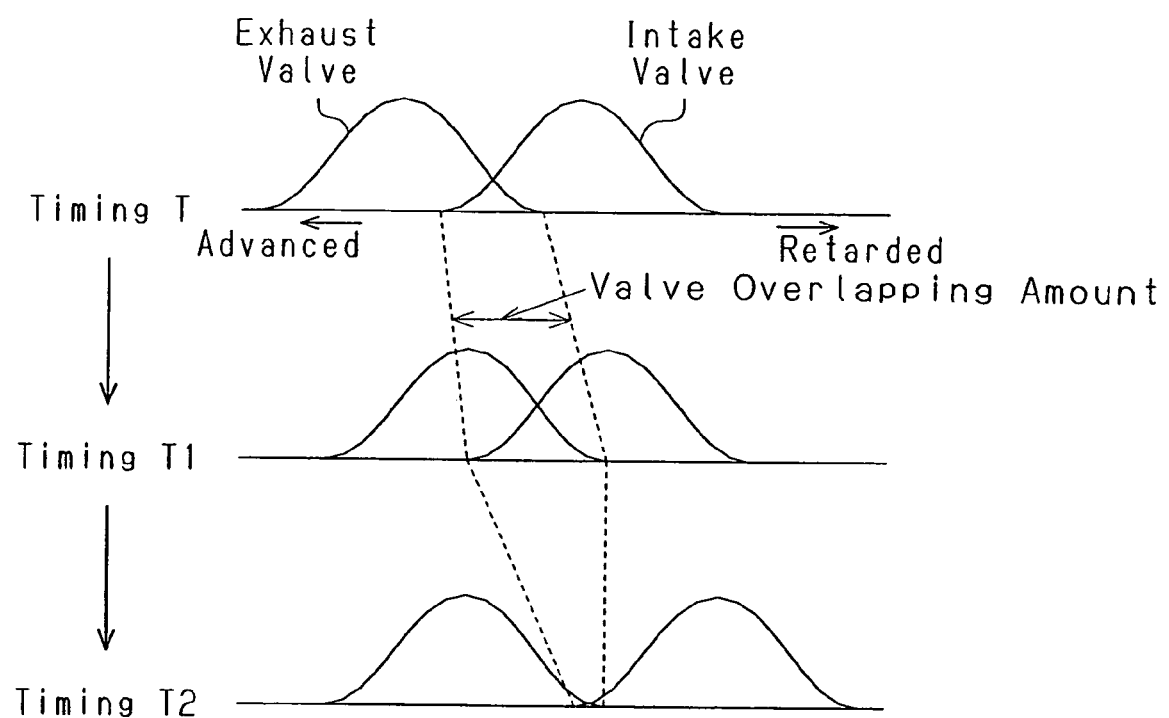
FIG. 11 is a timing chart indicating an example of controlling of the valve timings of the intake and the exhaust valves by a conventional valve actuation control apparatus.

However, referring to FIG. 10(b), when the requested exhaust angle EXREST is retarded with respect to the upper limit, the target intake angle VTTin is advanced in correspondence with the margin between the requested exhaust angle EXREST and the upper limit. The target exhaust angle VTTex is advanced in correspondence with the margin. This prevents the final target exhaust angle VTTex from being set to a value larger than the upper limit (the retarding limit). In other words, by advancing the target intake angle VTTin in correspondence with the margin between the requested exhaust angle EXREST and the upper limit of the actual exhaust angle VTex, retarding of the actual exhaust angle VTex is prevented from becoming insufficient. The target valve overlapping amount ORT is thus achieved.

The limits of the actual exhaust angle VTex may include the upper and lower limits of the control range of the exhaust valve timing varying mechanism 60b.

In the illustrated embodiment and above-described modifications, the control limit of the exhaust valve timing varying mechanism 60b is set to a value corresponding to the actual exhaust angle VTex (limit of the displacement angle of the exhaust camshaft 32). By the way, the valve actuation such as the actual exhaust angle VTex affect the operation efficiency of the engine 1. If an excessively large or small value is set as the limit of the actual exhaust angle VTex, the operation efficiency of the engine 1 may be lowered. Thus, limits of the valve actuation in terms of a sufficient operation efficiency of the engine 1 such as a engine operational state, a engine efficiency, combustion efficiency, a engine speed, or engine load to be prevented from being hampered may be set to the limits of the actual exhaust angle VTex. This suppresses the lowering of the engine operation efficiency preferably.

In the illustrated embodiment and above-described modifications, the target exhaust angle VTTex is computed based on the actual intake angle VTin and the target valve overlapping amount ORT. However, in a similar manner, the target intake angle VTTin may be determined based on the actual exhaust angle VTex and the target valve overlapping amount ORT. In this case, the first and second correcting values H1, H2 may be computed as correcting values for the target exhaust angle VTTex, in a manner similar to those of the illustrated embodiment.

In the illustrated embodiment and above-described modifications, the displacement angles of the intake valve 17 and the exhaust valve 18 are used as the values representing the valve timings of the intake valve 17 and the exhaust valve 18, respectively. However, the present invention is not restricted to this but may employ different parameters as the values representing the valve timings of the intake and exhaust camshafts 31, 32, other than the displacement angles.

The variable valve mechanism of the illustrated embodiment and above-described modifications varies the valve timing of each of the intake valve 17 and the exhaust valve 18 as the valve actuation. However, the valve actuation control apparatus of the present invention does not necessarily have to be applied to this type of the variable valve mechanism. The present invention may be applied to, for example, a variable valve mechanism that varies the valve lift amount and valve timing of each of the intake valve 17 and the exhaust valve 18 and a variable valve mechanism that varies only the valve lift amount of each of the valves. Even if the valve timing is fixed and only the valve lift amount of each valve is varied by the variable valve mechanism, the internal EGR amount is changed in correspondence with the variation of the valve lift amount, thus leading to the problem described in BACKGROUND OF THE INVENTION.

In these case, procedures similar to those of the illustrated embodiment and above-described modifications may be performed using the valve lift amount of each valve and an amount corresponding to the valve overlapping amount, which is, for example, an assumed valve overlapping amount obtained in correspondence with the valve lift amount and the valve timing of each valve. The advantages of the illustrated embodiment and above-described modifications are thus obtained.

More specifically, for example, the control apparatus 80 may function as a first computing portion for computing a target valve lift amount of one of the intake valve 17 or the exhaust valve 18, which is a first valve, according to the engine operational state. Based on the obtained target valve lift amount and the actual valve lift amount of the first valve, a target valve lift amount of the remaining valve, which is a second valve, is computed.

Further, a requested valve lift amount of the second valve may be computed in correspondence with the target valve overlapping amount and the target valve lift amount of the first valve. If the requested valve lift amount of the second valve is larger than an upper limit of an permitted range of the second valve or smaller than a lower limit of the range, the control apparatus 80 functions as a target actuation correcting portion (a second computing portion) that corrects the target valve lift amount of the first valve in correspondence with the margin between the requested valve lift amount of the second valve and the upper or lower limit of the corresponding permitted range.

More specifically, for example, if the requested valve lift amount of the second valve is larger than the upper limit of the corresponding permitted range, the target valve lift amount of the first valve is increased in correspondence with the margin between the requested valve lift amount of the second valve and the upper limit of the second valve. This prevents the target valve overlapping amount from becoming smaller than the actual valve overlapping amount.

In contrast, if the requested valve lift amount of the second valve is smaller than the lower limit of the corresponding permitted range, the target valve lift amount of the first valve is decreased in correspondence with the margin between the requested valve lift amount of the second valve and the corresponding lower limit of the second valve. This prevents the target valve overlapping amount from becoming larger than the actual valve overlapping amount.

In the illustrated embodiment and above-described modifications, the present invention is applied to the valve actuation control apparatus for the gasoline engine 1. However, the present invention is not restricted to this type of application but may be applied to different types of engines as long as the engines include a variable valve mechanism varying valve actuation of an intake valve and a separate variable valve mechanism for varying valve actuation of an exhaust valve.

The invention claimed is:

1. A control apparatus for valve actuation of intake and exhaust valves of an internal combustion engine, the apparatus controls actual actuation of each of the intake valve and the exhaust valve to the corresponding target actuation, wherein one of the intake valve and the exhaust valve is a first valve and the other is a second valve, wherein the actuation of the second valve is set within a predetermined permitted range, the apparatus comprising:
   a first computing portion that computes the target actuation of the first valve and a target valve overlapping amount according to the engine operational state, the target valve overlapping amount being a target amount of a valve overlapping amount of a valve opening period of the first valve and a valve opening period of the second valve, wherein the first computing portion computes the target actuation of the second valve based on the target valve overlapping amount and the actual actuation of the first valve; and
   a second computing portion that computes a requested actuation of the second valve based on the target valve overlapping amount and the target actuation of the first valve, wherein, when the requested actuation is out of the permitted range of the second valve actuation, the second computing portion corrects the target actuation of the first valve based on the margin between the requested actuation and a limit of the permitted range.

2. The apparatus according to claim 1, further comprising a variable valve actuation mechanism that varies the actuation of the second valve, wherein the permitted range of the actuation of the second valve is set in accordance with a variable range of the variable valve actuation mechanism.

3. The apparatus according to claim 1, wherein the permitted range of the actuation of the second valve is set in accordance with the engine operation efficiency.

4. The apparatus according to claim 1, wherein each of the actuation of the first valve and the actuation of the second valve is valve timing,
   wherein the second computing portion computes a requested valve timing of the second valve, wherein, when the requested valve timing is out of the permitted range towards the advanced side, the second computing portion corrects a target valve timing of the first valve by retarding it by an amount equivalent to the margin between the requested valve timing and an advanced side limit of the permitted range.

5. The apparatus according to claim 1, wherein each of the actuation of the first valve and the actuation of the second valve is valve timing,
   wherein the second computing portion computes a requested valve timing of the second valve, wherein, when the requested valve timing is out of the permitted range towards the retarded side, the second computing portion corrects a target valve timing of the first valve by advancing it by an amount equivalent to the margin between the requested valve timing and a retarded side limit of the permitted range.

6. An internal combustion engine comprising:
   an intake valve;
   an exhaust valve, wherein one of the intake valve and the exhaust valve is a first valve and the other is a second valve;
   a variable valve actuation mechanism that varies the actuation of the first valve;
   a variable valve actuation mechanism that varies the actuation of the second valve, wherein the actuation of the second valve is set within a variable range of the variable valve actuation mechanism for the second valve;
   a first computing portion that computes a target actuation of the first valve and a target valve overlapping amount according to the engine operational state, the target valve overlapping amount being a target amount of a valve overlapping amount of a valve opening period of the first valve and a valve opening period of the second valve, wherein the first computing portion computes a target actuation of the second valve based on the target valve overlapping amount and the actual actuation of the first valve; and a second computing portion that computes a requested actuation of the second valve based on the target valve overlapping amount and the target actuation of the first valve, wherein, when the requested actuation is out of the permitted range of the second valve actuation, the second computing portion corrects the target actuation of the first valve based on the margin between the requested actuation and a limit of the permitted range.

7. A method for controlling valve actuation of intake and exhaust valves of an internal combustion engine, wherein one of the intake valve and the exhaust valve is a first valve and the other is a second valve, wherein the actuation of the second valve is set within a predetermined permitted range, the method comprising:

obtaining a target actuation of the first valve and a target valve overlapping amount according to the engine operational state, the target valve overlapping amount being a target amount of a valve overlapping amount of a valve opening period of the first valve and a valve opening period of the second valve;

obtaining a target actuation of the second valve based on the target valve overlapping amount and the actual actuation of the first valve;

obtaining a requested actuation of the second valve based on the target valve overlapping amount and the target actuation of the first valve; and correcting the target actuation of the first valve based on the margin between the requested actuation and a limit of the permitted range when the requested actuation is out of the permitted range of the second valve actuation.

making the actual actuation of each of the intake valve and the exhaust valve to the corresponding target actuation.

8. The method according to claim 7, further comprising:

setting the permitted range of the actuation of the second valve in accordance with a variable range of a variable valve actuation mechanism that changes the actuation of the second valve.

9. The method according to claim 7, further comprising:

setting the permitted range of the actuation of the second valve in accordance with the engine operation efficiency.

10. The method according to claim 7, wherein each of the actuation of the first valve and the actuation of the second valve is valve timing, wherein the requested actuation is a requested valve timing of the second valve, wherein, when the requested valve timing is out of the permitted range towards the advanced side, a target valve timing of the first valve is corrected by retarding it by an amount equivalent to the margin between the requested valve timing and a advanced side limit of the permitted range.

11. The method according to claim 7, wherein each of the actuation of the first valve and the actuation of the second valve is valve timing, wherein the requested actuation is a requested valve timing of the second valve, wherein, when the requested valve timing is out of the permitted range towards the retarded side, a target valve timing of the first valve is corrected by advancing it by an amount equivalent to the margin between the requested valve timing and a retarded side limit of the permitted range.

* * * * *